United States Patent
Mohamed

(10) Patent No.: US 11,615,374 B2
(45) Date of Patent: Mar. 28, 2023

(54) PROVENANCE AND ILLICIT PRODUCT CONTROL SYSTEM

(71) Applicant: IQ UNIVERSE INC., Manila (CA)

(72) Inventor: Iqbal Mohamed, Surrey (CA)

(73) Assignee: IQ UNIVERSE INC., Manila (CA)

( * ) Notice: Subject to any disclaimer, the term of this patent is extended or adjusted under 35 U.S.C. 154(b) by 0 days.

(21) Appl. No.: 17/268,031

(22) PCT Filed: Aug. 23, 2019

(86) PCT No.: PCT/IB2019/057117
§ 371 (c)(1),
(2) Date: Feb. 11, 2021

(87) PCT Pub. No.: WO2020/039398
PCT Pub. Date: Feb. 27, 2020

(65) Prior Publication Data
US 2021/0201257 A1    Jul. 1, 2021

Related U.S. Application Data

(60) Provisional application No. 62/722,444, filed on Aug. 24, 2018.

(51) Int. Cl.
*G06Q 10/08* (2012.01)
*G06Q 10/087* (2023.01)

(52) U.S. Cl.
CPC ................ *G06Q 10/087* (2013.01)

(58) Field of Classification Search
None
See application file for complete search history.

(56) References Cited

U.S. PATENT DOCUMENTS 5,778,370 A * 7/1998 Emerson ............... G06F 16/21
7,110,976 B2 * 9/2006 Heimermann ......... G06Q 40/04
                                                          705/37

(Continued)

FOREIGN PATENT DOCUMENTS

WO    WO-2017027648 A1    2/2017

OTHER PUBLICATIONS

ISA/CA, International Search Report and Written Opinion, dated Dec. 23, 2019 re PCT International Patent Application No. PCTIB2019057117.

*Primary Examiner* — Fateh M Obaid
(74) *Attorney, Agent, or Firm* — Perry + Currier Inc.

(57) ABSTRACT

A method for provenance and illicit product control involves generating a unique identifier for a product unit, generating a unique identifier for a subunit of the product unit, and recording locations of the product unit and the subunit of the product unit to a blockchain in association with the unique identifiers. The blockchain includes linked data blocks containing sequential records of locations and quantities of product units and subunits of the product units moved through a product distribution supply chain. The method further involves tracking movement of the product unit and the subunit of the product unit through the product distribution supply chain, detecting an inconsistency between a record on the blockchain and movement of the product unit or the subunit of the product unit through the product distribution supply chain and outputting an indication of the inconsistency.

20 Claims, 34 Drawing Sheets

The Combined Supply Chains of a Legitimate Industry Interacting with an Illicit Market

(56) References Cited

U.S. PATENT DOCUMENTS

| | | | |
|---|---|---|---|
| 7,725,558 B2* | 5/2010 | Dickenson | H04L 63/105 709/215 |
| 8,023,816 B2* | 9/2011 | Yukitake | G03B 17/20 348/333.02 |
| 2008/0002882 A1* | 1/2008 | Voloshynovskyy | G07D 7/005 380/201 |
| 2009/0112738 A1* | 4/2009 | Nagata | G06Q 30/04 705/28 |
| 2009/0287837 A1* | 11/2009 | Felsher | G06F 21/6245 709/229 |
| 2016/0125355 A1* | 5/2016 | Nazzari | G06Q 10/087 235/385 |
| 2017/0083860 A1 | 3/2017 | Sriram et al. | |
| 2017/0228742 A1* | 8/2017 | Aljawhari | G06Q 30/0185 |
| 2017/0262862 A1* | 9/2017 | Aljawhari | G06F 16/242 |
| 2018/0082043 A1* | 3/2018 | Witchey | G06Q 10/0633 |
| 2018/0096175 A1 | 4/2018 | Schmeling et al. | |
| 2018/0174097 A1 | 6/2018 | Liu et al. | |
| 2018/0374037 A1 | 12/2018 | Nazzari et al. | |
| 2019/0097806 A1 | 3/2019 | Vann et al. | |
| 2021/0248514 A1* | 8/2021 | Celia | G06Q 30/0201 |

* cited by examiner

The Combined Supply Chains of a Legitimate Industry
Interacting with an Illicit Market The Provenance and Illicit Product Control System (PIPCS) monitoring the Combined Supply Chains of an Industry PIPCS Monitoring Legitimate Activity:
Entry, Exit and Movement of Products within an Industry Movement of Products Through an Industry's Supply Chain

Components and Participants within the Provenance and Illicit Product Control System (PIPCS)

PIPCS and Interfaces with Participating Company Systems

Provenance and Illicit Product Control System (PIPCS)

Distributed Consensus Network

Processing of User and System Requests

Anatomy of a Transaction Event Handler within the Consensus Network

Technical Architecture of PIPCS

Supply Chain Process for Production
(Manufactured, Produced, Cultivated, Harvested, Mined)

Supply Chain Process for Intake

Supply Chain Process for Shipping

Supply Chain Process for Receiving

Supply Chain Process for Sale

Supply Chain Process for Sale Return

Supply Chain Process for Outflow

Supply Chain Process for Spoiled, Damaged or Expired Products

Supply Chain Process for Planned Destruction

Supply Chain Process for Spot check or Random Audit

Supply Chain Process for Voluntary Reporting by End-consumer

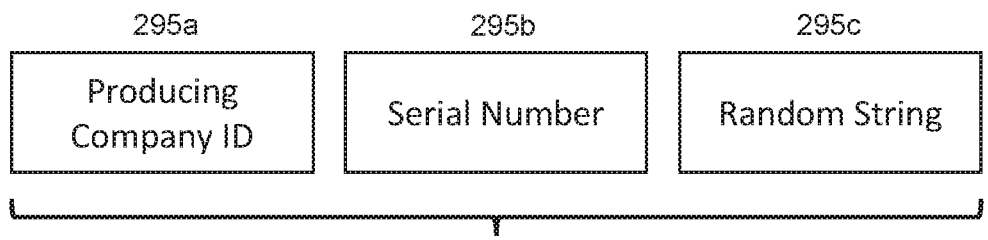
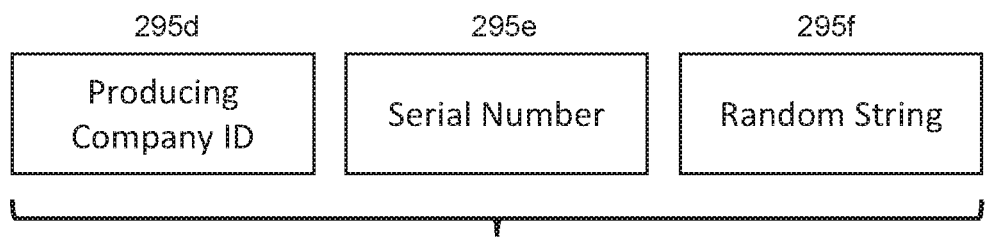
Generation of Unique Identifiers
FIG. 23

| UID | Event | Product ID | Location | Destination | Clild UIDs | | |
|---|---|---|---|---|---|---|---|
| [296a] | [296c] | [296d] | [296e] | [296f] | [296g] | | |
| Request UIDs [205a] | | | | | | | |
| UID1 | New UID | | | | | | |
| UID2 | New UID | | | | | | |
| UID3 | New UID | | | | | | |
| UID4 | New UID | | | | | | |
| UID5 | New UID | | | | | | |
| UID6 | New UID | | | | | | |
| UID7 | New UID | | | | | | |
| UID8 | New UID | | | | | | |
| UID9 | New UID | | | | | | |
| UID10 | New UID | | | | | | |
| UID11 | New UID | | | | | | |
| UID12 | New UID | | | | | | |
| UID13 | New UID | | | | | | |
| Production Run for Unit Products [205b] | | | | | | | |
| UID1 | New Unit Product | ABC01 | Co. 1, Loc. A | | | | |
| UID2 | New Unit Product | ABC01 | Co. 1, Loc. A | | | | |
| UID3 | Spoiled | | | | | | |
| UID4 | New Unit Product | ABC01 | Co. 1, Loc. A | | | | |
| UID5 | New Unit Product | ABC01 | Co. 1, Loc. A | | | | |
| UID6 | New Unit Product | ABC01 | Co. 1, Loc. A | | | | |
| UID7 | Spoiled | | | | | | |
| UID8 | New Unit Product | ABC01 | Co. 1, Loc. A | | | | |
| UID9 | New Unit Product | ABC01 | Co. 1, Loc. A | | | | |
| UID10 | New Unit Product | ABC01 | Co. 1, Loc. A | | | | |
| Production Run for Cartonized Products [205c] | | | | | | | |
| UID11 | New Carton Product | ABC01-3 | Co. 1, Loc. A | | UID1 | UID2 | UID4... |
| UID12 | New Carton Product | ABC01-3 | Co. 1, Loc. A | | UID5 | UID6 | UID8... |

Transaction Data – Relevant Attributes (1 of 2)

FIG. 24

| UID | Event | Product ID | Location | Destination | Child UIDs | | |
|---|---|---|---|---|---|---|---|
| [296a] | [296c] | [296d] | [296e] | [296f] | [296g] | | |
| *Shipping [205d]* | | | | | | | |
| UID13 | Dispatch Shipment | | Co. 1, Loc. A | Co. 2, Loc. A | UID11 | UID12 | |
| UID1 | Added to Shipment | ABC01 | Co. 1, Loc. A | Co. 2, Loc. A | | | |
| UID2 | Added to Shipment | ABC01 | Co. 1, Loc. A | Co. 2, Loc. A | | | |
| UID4 | Added to Shipment | ABC01 | Co. 1, Loc. A | Co. 2, Loc. A | | | |
| UID5 | Added to Shipment | ABC01 | Co. 1, Loc. A | Co. 2, Loc. A | | | |
| UID6 | Added to Shipment | ABC01 | Co. 1, Loc. A | Co. 2, Loc. A | | | |
| UID8 | Added to Shipment | ABC01 | Co. 1, Loc. A | Co. 2, Loc. A | | | |
| UID11 | Added to Shipment | ABC01-3 | Co. 1, Loc. A | Co. 2, Loc. A | UID1 | UID2 | UID4... |
| UID12 | Added to Shipment | ABC01-3 | Co. 1, Loc. A | Co. 2, Loc. A | UID5 | UID6 | UID8... |
| *Receiving [205e]* | | | | | | | |
| UID13 | Shipment Received | | Co. 2, Loc. A | | UID11 | UID12 | |
| UID1 | Received into Inventory | ABC01 | Co. 2, Loc. A | | | | |
| UID2 | Received into Inventory | ABC01 | Co. 2, Loc. A | | | | |
| UID4 | Received into Inventory | ABC01 | Co. 2, Loc. A | | | | |
| UID5 | Received into Inventory | ABC01 | Co. 2, Loc. A | | | | |
| UID6 | Received into Inventory | ABC01 | Co. 2, Loc. A | | | | |
| UID8 | Received into Inventory | ABC01 | Co. 2, Loc. A | | | | |
| UID11 | Received into Inventory | ABC01-3 | Co. 2, Loc. A | | UID1 | UID2 | UID4... |
| UID12 | Received into Inventory | ABC01-3 | Co. 2, Loc. A | | UID5 | UID6 | UID8... |
| *Sell Unit Product [205f]* | | | | | | | |
| UID1 | Sold | ABC01 | Co. 2, Loc. A | | | | |
| UID11 | De-cartonized | ABC01 | Co. 2, Loc. A | | UID1 | UID2 | UID4... |

Transaction Data – Relevant Attributes (2 of 2)

FIG. 25

Real-time Validations

Asynchronous Validation

Billing and Charge-back System

Security

Seamless integration of Peer implementations of PPICS

PROVENANCE AND ILLICIT PRODUCT CONTROL SYSTEM

FIELD

The present disclosure relates to information processing, and in the processing of information related to a supply chain.

BACKGROUND

The companies comprising an industry, or a subset of an industry, produce new products or intake products from producers who are non-participating companies and transfer these products from one company to another, until the products are sold to the end-consumer, or otherwise exit the industry, by being consumed within the industry, or by outflow to non-participating companies, or otherwise damaged or destroyed. During this activity, a proportion of the products may be stolen, or diverted out of the industry in contravention of the companies' contractual obligations. Illegally produced products may also be injected into the industry, causing financial and reputational harm to companies within the industry, and possibly causing financial and/or physical harm to the consumer due to sub-standard quality.

Current methods for detecting illicit activity within an industry involve the tagging of unique identification to each item and the tracking of individual products, where the sending company sends the relevant tracking information to a central software system, or to the destination company, when it sends the products to the destination company. The tracking data may to assist in audits and future investigations.

These methods have proven to be inadequate and illicit activity continues to comprise a significant portion of the activity of many industries. Bogus, but seemingly authentic, unique identifiers can be generated, or old valid unique identifiers can be recycled, and counterfeit products can be tagged with them. Such counterfeit products can be injected into the inventory of intermediary companies, and these products can be forwarded to other companies downstream in the supply chain with accompanying, seemingly authentic, tracking information. The current methods can do very little to detect and curb diversion and theft. The current methods also cannot support a halt to the sale or movement of recalled products. These methods also do not provide capability to integrate between different examples, such as between different jurisdictions.

SUMMARY

The present disclosure relates to ensuring the integrity of legitimate products as they move through a supply chain and detecting and restricting illicit activity in the supply chain. The present disclosure thus provides a system which is able to capture and track individual products, either packaged singularly or in aggregate, where the tracking data is available to participating companies, which interact with the products, in the industry's supply chain, and which can confirm or deny the validity of a given transfer of products. Further, the system can detect missing products likely lost to theft or diversion.

The software system may track the supply chain of a company that produces new products or intakes products from non-participating companies and generate unique identifiers for each new product entering the supply chain. The sending company may use the software system to report the tracking event for the initiation of each product transfer, and the software system may validate the shipment event against the centralized data it is accumulating about each item via its assigned unique identifier. The system may deny authorization for the shipment if tracking data in its database does not match shipment data and contents. The receiving company may report the tracking event for the culmination of the transfer and may receives confirmation or denial of the validity of the transfer. Companies may use the software system to report the sale event of each item to an end customer and receive confirmation of the validity of the sale. If an invalid event is detected, the software system may reports this to law enforcement or other responsible authorities, based on configuration.

Each report of an initiation of a product transfer may be confirmed to contain only individual products which are on record to be available to be transferred from the reported location. The culmination of product transfer may be confirmed to be that of an initiated product transfer on record, from the reported sending location, to the reported receiving location. The sale of an individual good to an end customer may be confirmed to be available for sale at the reported location at time of the sale. If the software system finds that a range of the serially assigned unique identifiers for products are skipped by a company sending products downstream, the system may raise the alert that it has detected possible theft or diversion. Where the products are a consumer level product, the end consumers may use a mobile electronic device and a software module that is made publicly available to request the tracking information of a given unique identifier of a good from the software system, and the software system may validate this sold product against its centralized tracking data. End consumers may use the mobile electronic device and the software module to voluntarily report information about any suspicious products, along with details possibly useful to investigators, to the appropriate authorities. The software system may execute additional algorithms in the background to search for patterns of product transfer to identify patterns of illicit activity, such as to compare the actual volume of products produced by a company against the known production capacity of that company, or the aggregate products of a given type, or raw materials, received by a company against the aggregate products shipped by that company. The software system may also be integrated into a supply chain system to halt sale or movement of flagged products.

The software system may be configurable according to a particular industry and the regulatory requirements thereof for the validation rules it executes for each event, for the types of alerts and the recipients of the alerts, and whether a given validation failure can be overridden by an employee with supervisory authorization. Thus, legitimate entry of products into the industry supply chains, such as production and intake, and legitimate exit of products out of the industry supply chains, such as final sale, outflow, consumption in a production process, spoilage, and destruction, are tracked.

Mobile electronic devices may be used to request the full tracking history of an individual item. Further, it may be determined whether products have been transferred outside of the tracked supply chain based on skipped ranges of serial numbers, analysis of volumes of goods distributed through a supply chain, and other techniques. Data analytics techniques may be applied to historical tracking data to search for additional patterns of illicit activity, such as when a company transfers or sells more products than it receives or produces. The tracking data may be stored on a blockchain (i.e. distributed ledger), which may be entirely public, entirely private, or include both public and private portions. Private portions of a blockchain may be made accessible only to a set of member companies of an industry to maintain privacy among companies.

Further techniques may be used to provide provenance and illicit product control, including validating the actual quantity of production against known production capacity, quantity of products received against quantity of products shipped (or sold) and quantity of products in inventory, quantity of end-user consumable products received against quantity of end-user consumable products used as ingredient in the manufacture of another product.

Thus, according to an aspect of the disclosure, a method for provenance and illicit product control involves generating a unique identifier for a product unit and generating a unique identifier for a subunit of the product unit. The method further involves recording a location of the product unit to a blockchain in association with the unique identifier for the product unit, the blockchain including linked data blocks containing sequential records of locations and quantities of product units and subunits of the product units moved through a product distribution supply chain. The method further involves recording a location of the subunit of the product unit to the blockchain in association with the unique identifier for the subunit of the product unit and tracking movement of the product unit and the subunit of the product unit through the product distribution supply chain. The method further involves detecting an inconsistency between a record on the blockchain and movement of the product unit or the subunit of the product unit through the product distribution supply chain and outputting an indication of the inconsistency.

According to another aspect of the disclosure, a provenance and illicit product control system includes a communication interface to communicate with nodes of a blockchain network. The blockchain network includes nodes to verify linked data blocks containing sequential records of locations and quantities of product units and subunits of the product units moved through a product distribution supply chain. The system further includes a controller to execute instructions to track movement of the product unit and the subunit of the product unit through the product distribution supply chain, detect an inconsistency between a record on the blockchain and movement of the product unit or the subunit of the product unit through the product distribution supply chain, and output an indication of the inconsistency.

According to yet another aspect of the disclosure, a device to detect an inconsistency in movement of product through a product distribution supply chain includes a scanner to scan a mark encoded with a unique identifier for a product unit or a subunit of the product unit. The device further includes memory to store blockchain data, the blockchain data including sequential records of locations and quantities of product units and subunits of the product units moved through a product distribution supply chain, the blockchain data being recorded to a blockchain. The device further includes a display and a controller to execute instructions to access a blockchain network hosting the blockchain, detect an inconsistency between a first record on the blockchain and a second record on the blockchain, display a list of previously recorded locations of the product unit or the subunit of the product unit on the blockchain through the display, and display an indication of the inconsistency through the display.

BRIEF DESCRIPTION OF THE DRAWINGS

FIG. 23 is a schematic diagram of an example data structure of a unique identifier used to tag individual items.

FIG. 24 is a schematic diagram of an example data structure of data attributes of tracking data for different products movement and lifecycle events.

FIG. 25 is a schematic diagram of another example data structure of data attributes of tracking data for different products movement and lifecycle events.

DETAILED DESCRIPTION

Figure 1:
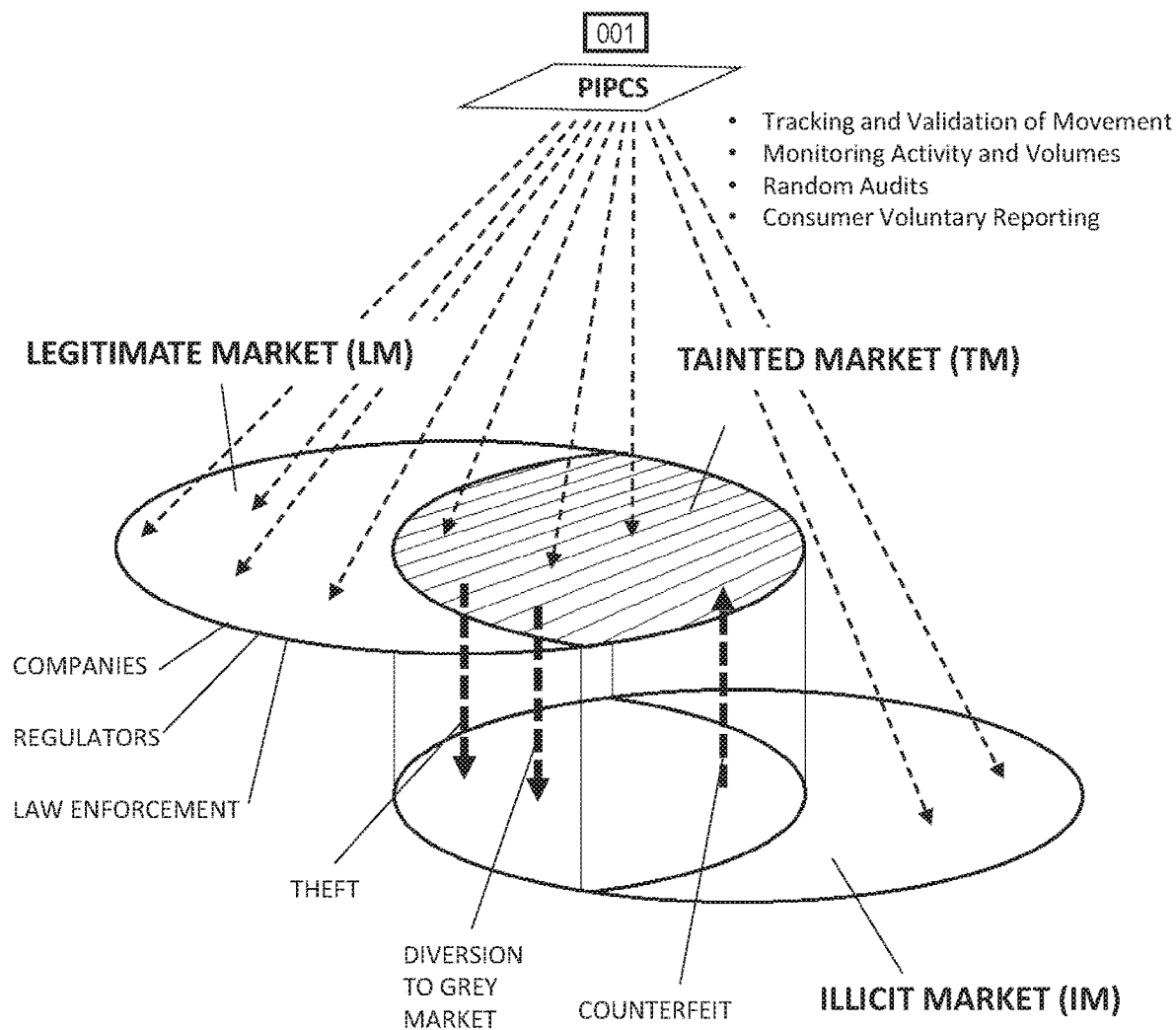
FIG. 1 is a schematic diagram of an example system for provenance and illicit product control for monitoring legitimate activity of the combined supply chains of an industry interacting with an illicit Black Market or Grey Market.

FIG. 1 shows a system indicated generally at 001. System 001 includes an example industry and of subsets of the industry including participating companies, regulators and law enforcement. FIG. 1 depicts the combined supply chains of participating companies as the combination of the legitimate market ("LM"), the illicit market ("IM") and the tainted market ("TM"), the seemingly legitimate market affected by illicit activity.

Figure 2:
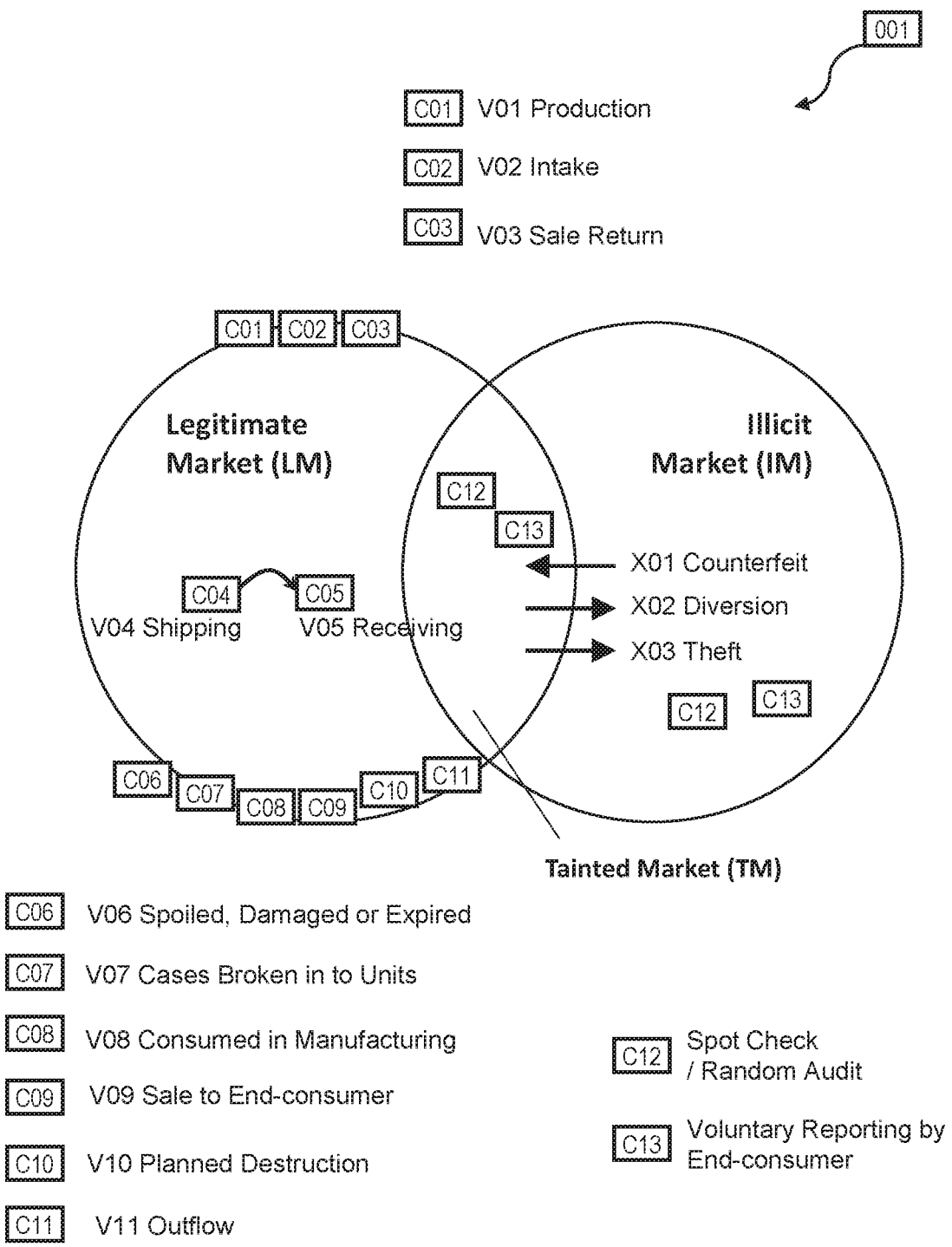
FIG. 2 is a schematic diagram of an example system in which the combined supply chains of an industry comprising both legitimate and illegitimate activity and checkpoints implemented to track and validate activity.

FIG. 2 elaborates on the tracking and validation activities of System 001. FIG. 2 indicates legitimate activities V01 to V11 as well as illicit activities such as injection of counterfeit products into the industry X01, diversion of legitimate products X02 out of the LM into the IM, and theft of legitimate products X03 out of the LM into the IM. FIG. 2 further indicates checkpoints C01 to C11, which monitor legitimate activities V01 to V11. Track and validate checkpoints for production C01 and intake C02 provide a security cordon to prevent illicit products to enter the industry supply chains at legitimate entry points, while sale return C03 provides a checkpoint to validate the re-entry of legitimate products. Track and validate checkpoints for shipping C04 and receiving C05 monitor change of custody of legitimate products. Track and validate checkpoints for spoiled, damaged or expired products C06, cases broken into units C07, consumed in manufacturing C08, sale to end-consumer C09, planned destruction C10, and product outflow C11, prevent diversion of legitimate products from legitimate egress points. Track and validate checkpoints for spot check or random audit C12 and voluntary reporting by end-consumer C13 give the present system the further capability to randomly sample products in the industry as an additional means to detect illicit products, such as counterfeit X01, diversion (products diverted to grey market) X02, or theft (stolen products in the black market) X03.

Figure 3:
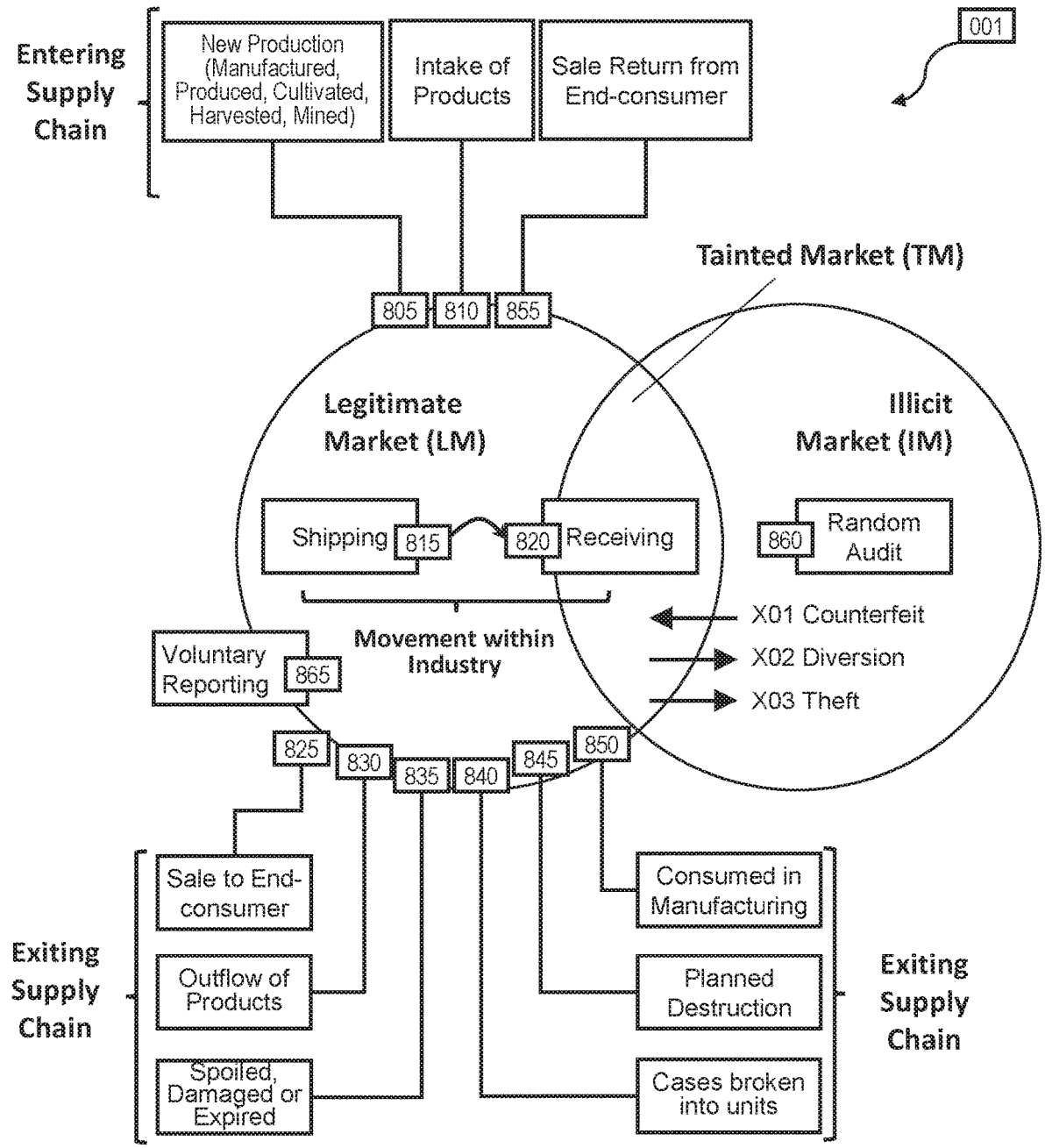
FIG. 3 is a schematic diagram of an example system for provenance and illicit product control in which various legitimate events within an industry where products are added to, removed from, or transferred within in supply chains.

FIG. 3 shows additional detail of system 001 and highlights the monitoring of legitimate events. The system 001 monitors and validates products at various checkpoints, including legitimate entry and egress points, as well as points where a change of custody or a product transfer takes place. Entry point 805 (further elaborated in FIG. 12) to the industry supply chains represents the entry of new, legitimately produced goods, while entry point 810 (further elaborated in FIG. 13) represents the entry of intake products. Entry point 855 (further elaborated in FIG. 17) represents the return of sale from end-consumer. The transfer of legitimate products are also monitored, both at the point of shipment 815 (further elaborated in FIG. 14), and the point of receipt 820 (further elaborated in FIG. 15). Legitimate egress points are monitored: the final sale of products to the end consumer 825 (further elaborated in FIG. 16), the breaking of an aggregate package 840, the consumption of products in a manufacturing process 850, the outflow of products 830 (further elaborated in FIG. 18), the damage or spoilage of products 835 (further elaborated in FIG. 19), or the intentional destruction of products 845 (further elaborated in FIG. 20). The system supports random audits of products throughout the industry, and such are represented by checkpoint 860 (further elaborated in FIG. 21). End-consumers also have the ability to report any suspect products, represented by checkpoint 865 (further elaborated in FIG. 22).

Figure 4:
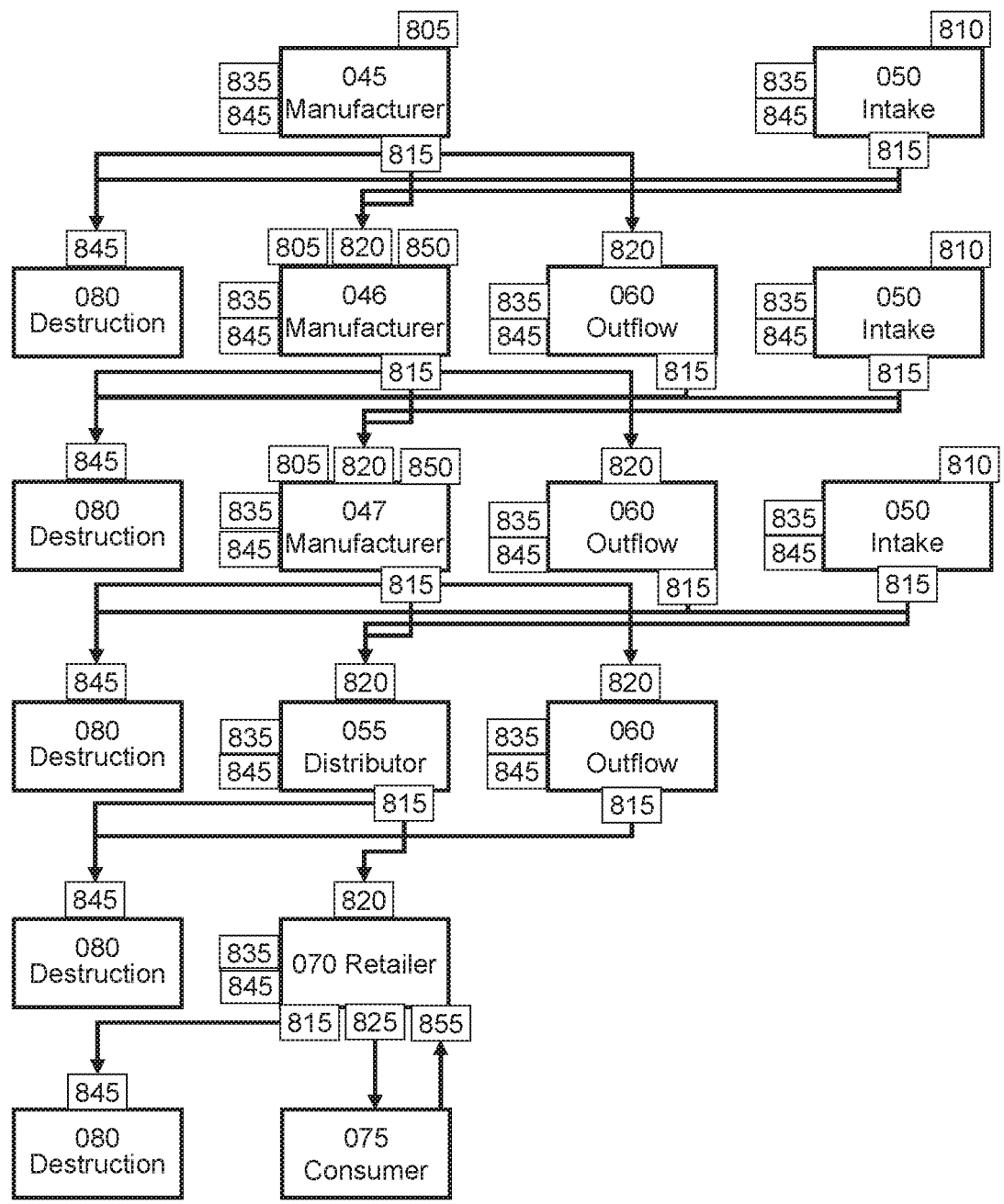
FIG. 4 is a schematic diagram of an example supply chain system in which companies in an industry interact with the legitimate movement of products.

FIG. 4 further elaborates on FIG. 3 by showing the various types of companies within the industry chains, the entry and egress points where products enter or leave the industry, and the events associated with the transfer of products between companies.

Manufacturers 045, 046, and 047 represent one industry entry point, production of goods 805, and three egress points, products lost due to damage or spoilage 835, and planned destruction of products 845, and shipment to downstream companies 815. Manufacturers 045, 046 ship products 815 to other companies within the industry who are also manufacturers 046, 047. They also ship to companies who specialize in planned destruction of products 080. Manufacturers 047 ship products 815 to distributors 055.

Intake 050 represents one industry entry point, intake of products from a non-participating company 810, and three egress points, products lost due to damage or spoilage 835, planned destruction of products 845 (if so authorized), and shipment to downstream companies 815. They ship to companies downstream in the supply chain, which are manufacturers 046/047 or distributors 055. They also ship to companies who specialize in planned destruction of products 080.

Manufacturers 046, 047 can receive product shipments 820 from other manufacturers who are participating companies 045, 046, or intake products 050, upstream in the supply chain.

Companies that carry out destruction of products 080 represent one egress point, planned destruction 845. Where permitted by regulations to do so, manufacturers 045, 046, 047, distributors 055, and retailers 080 may also carry out their own planned destruction of products 045.

Outflow 060 participating companies ship products out of the (geographically delineated) industry supply chains represent four egress points, product outflow 820, products lost due to damage or spoilage 835, planned destruction of products 845 (if so authorized), and shipment to downstream companies 815. They ship to companies who specialize in planned destruction of products 845.

Distributors 055 receive product shipments 820 from manufacturers 045 or intake 050, upstream from them in the supply chain, and ship products 815 to retailers 070, or to companies that do planned destruction 080. Distributors have two egress points, damage or spoilage 835, or planned destruction of products 845.

Retailers 070 receive product shipments from distributors 055, and have one egress point where they make final sale of products to consumers 075. They may also ship products to companies specializing in planned destruction 080.

Figure 5:
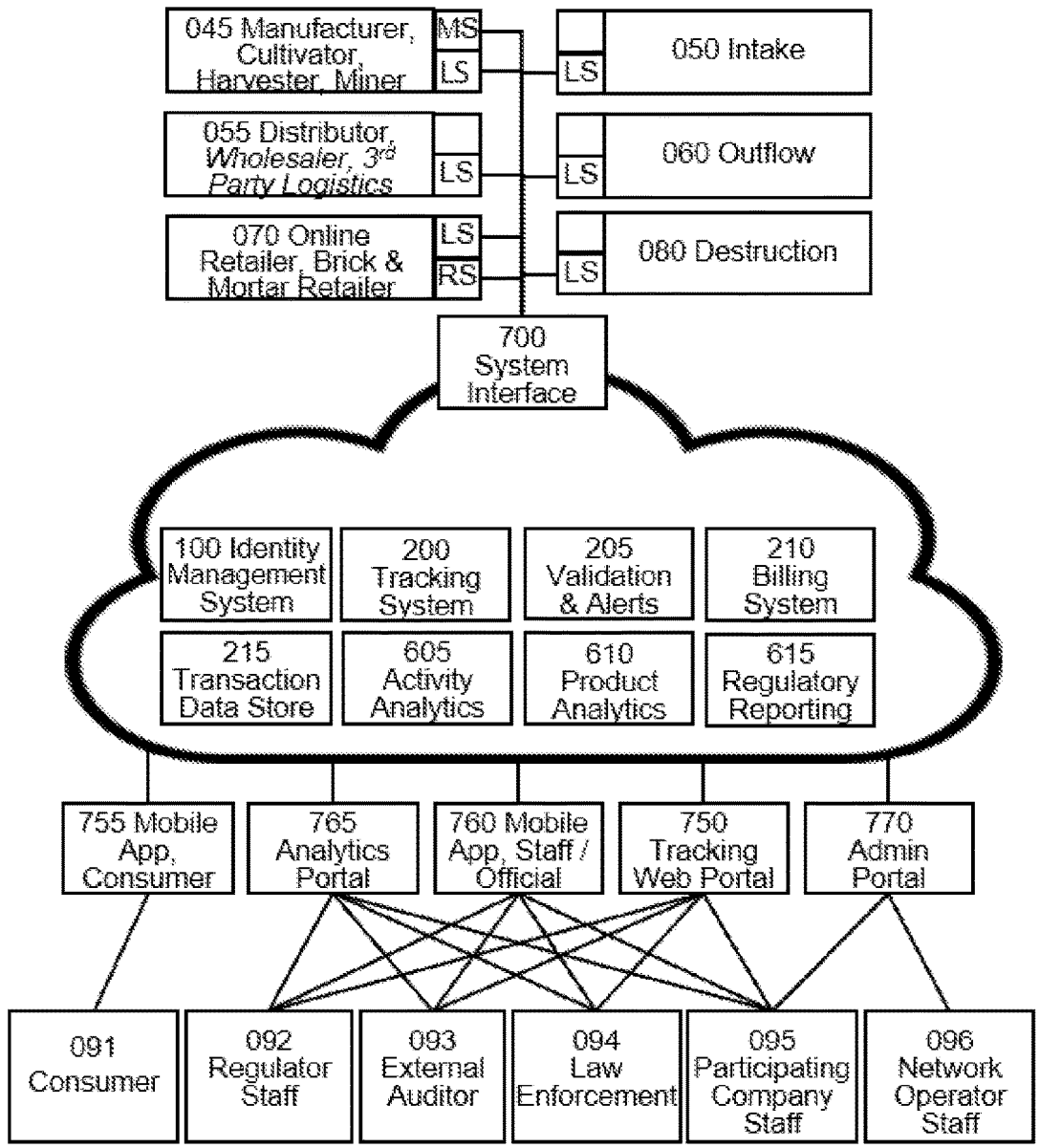
FIG. 5 is a schematic diagram of an example system for provenance and illicit product control including participating companies, individuals and software components.

FIG. 5 depicts the various company systems and individuals which interact with the present system to carry out its function. Producing companies (manufacturers, cultivators, harvesters, miners, etc. 045) have software systems for manufacturing ("MS") and software systems for logistics ("LS"). Distributor companies, including wholesalers and 3rd party logistics companies 055) have software systems for logistics (LS). Retailer companies (brick and mortar as well as online 070) have software systems for logistics (LS) and software systems for retail ("RS") intake 050 and outflow 060 companies have software systems for logistics (LS). Companies specializing in planned destruction of products 080 have software systems for logistics (LS). Each of these systems interface with a system for provenance and illicit product control.

Individuals, in their various roles, also interact with the software systems comprising the system for provenance and illicit product control. Consumers 091 utilize mobile application software 755 on mobile electronic devices. Staff from industry regulatory bodies 092, external auditors 093, staff from law enforcement agencies 094, and staff from companies participating in the industry utilize widely available web browser software on personal computers to interact with the user interface of the data analytics component 765 and the products tracking component 750 and mobile application software 760 on mobile electronic devices to interact with various system functions. Staff from companies participating in the industry supply chains 095, who have been assigned additional system access, will also utilize web browser software on personal computers to interact with the user interface of the system and user administration component, as will staff from the organization operating the system 096.

Figure 6:
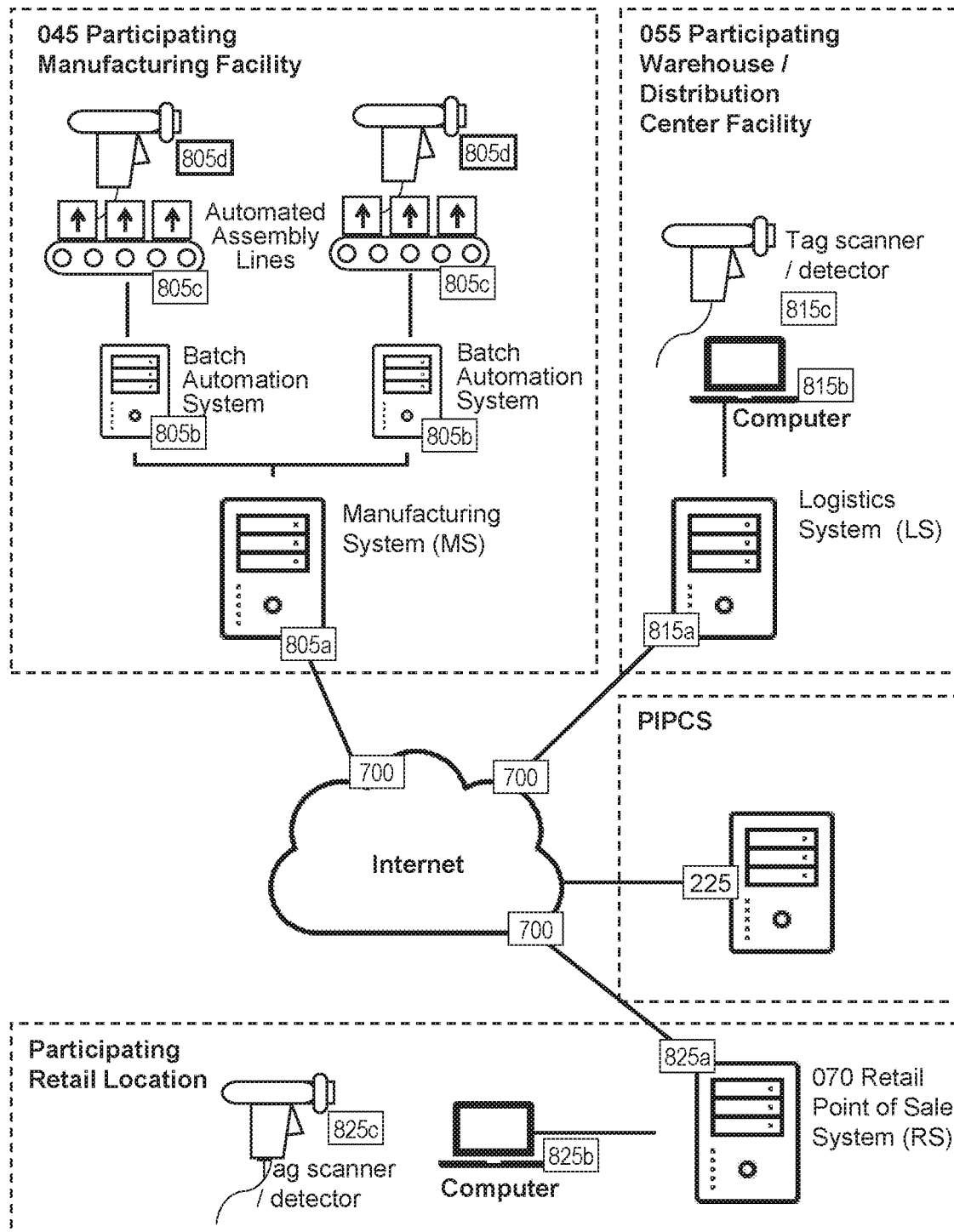
FIG. 6 is a schematic diagram of an example system for provenance and illicit product control showing interactions between various company systems and software components.

FIG. 6 provides further detail of the machinery, electronic devices, and computer systems for a producer company (a manufacturer, cultivator, harvester, miner). A producing company 045 which is nominally automated, has a MS, executing in a computer 805a, which helps manage its manufacturing processes and oversees a number of batch automation systems 805b. Each batch automation system 805b further oversees automated assembly lines 805c containing actuators and high speed cameras which are under the software control of the batch information systems 805b. The computer 805a executing MS integrates with the system interface 700 of the Provenance and Illicit Product Control System ("PIPCS"), with entry-point at 225, and is able to send requests or reports to the system.

A distribution company 055 (a wholesaler or distributor), or a 3rd party logistics company acting on behalf of the distribution company, which is nominally automated, has a system for logistics (LS), executing on a computer 815a, which helps manage its logistics processes, and is linked to personal computers 815b, which staff use to access various functions of logistics software running in the LS. These personal computers 815b are also connected to tag detectors 815c which are able to scan tags on individual and aggregate packages of products. The computer 815a executing this LS integrates with the system interface 700 of the system (PIPCS), with entry-point at 225, and is able to send requests or reports to the system.

A retail company 070 (a bricks and mortar retailer or an online retailer) which is nominally automated, has a RS executing on a computer 825a, which helps manage its retail processes, and is linked to point of sale terminals 825b, which are connected to tag detectors 825c, and is thus able to scan tags on individual or aggregate packages of products. The computer 825a executing this RS integrates with the system interface 700 of the system comprising the system (PIPCS), with entry point at 225, and is able to send requests or reports to the system.

Figure 7:
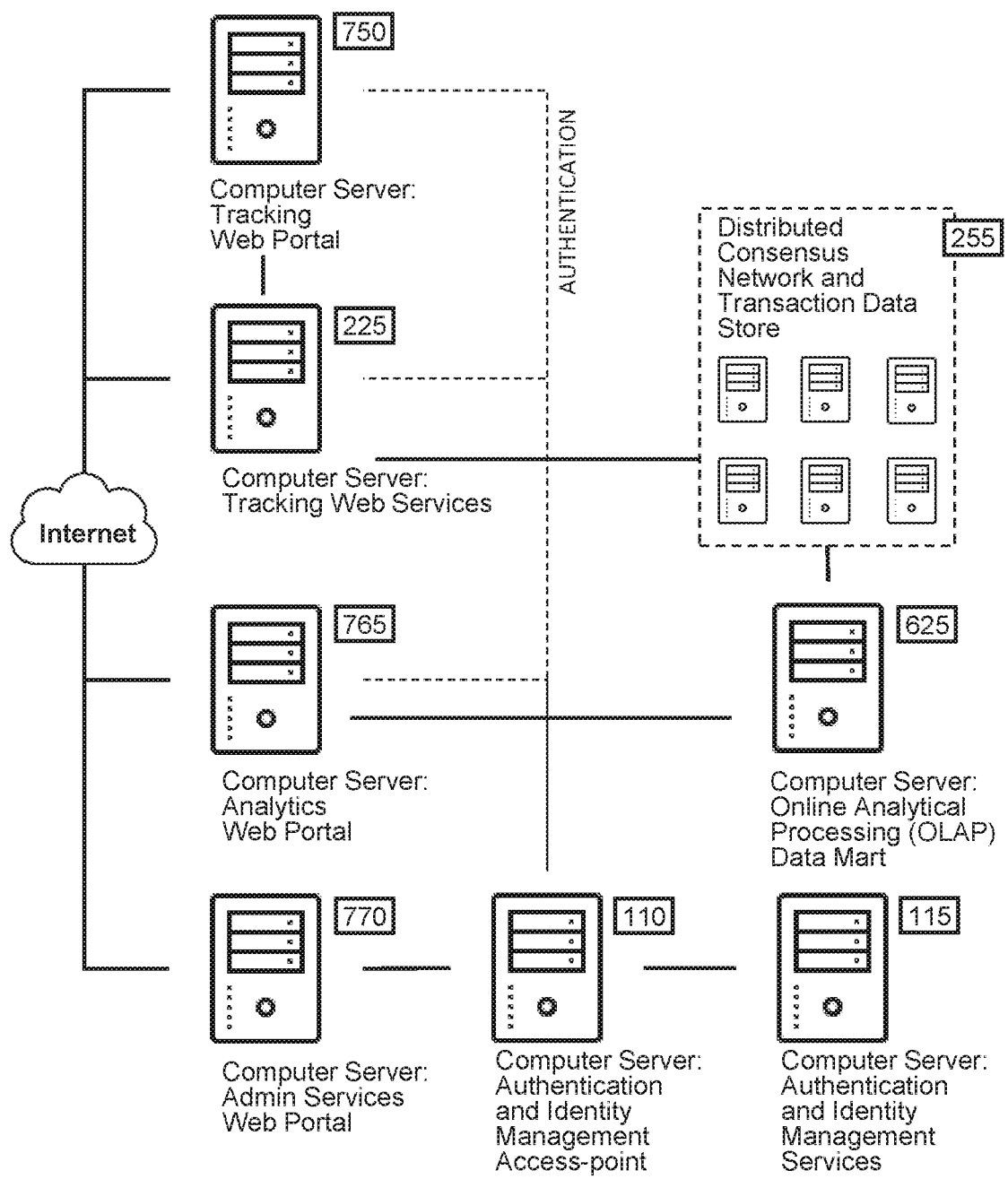
FIG. 7 is a schematic diagram of example system for provenance and illicit product control including internal structure and components for authenticating users and systems, maintaining tracking information, detecting potential illicit activity, providing software interfaces to external software systems, and providing user interfaces to individual users.

In FIG. 7, there is additional detail of the PIPCS, depicting the system's components responsible for responding to requests from the authorized external software systems of participating companies, regulators and law enforcement agencies, and from the web browsers utilized by authorized individual users. The requests made by web browsers that individual users use in their personal computers to access the tracking functions of PIPCS are processed by a computer executing the Tracking Service Web Portal component 750. Similar requests made by web browsers to access the data analytics functions of PIPCS are processed by a computer executing the Analytics Web Portal component 765. Requests made by web browsers to access the system and user administration functions of PIPCS are processed by a computer executing the Admin Services Web Portal component 770. Requests made by authorized external systems executing on computers at participating users' facilities, such as a manufacturing system (MS), a logistics system (LS), or a retail system (RS), are processed by the Tracking Web Services component 225. Requests arriving at the front-end computer servers 750, 225, 765 and 770 are first authenticated by the computer server 110 before their requests are processed.

The Tracking Service Web Portal component 750 interfaces with the Tracking Web Services component 225 to invoke code within PIPCS to service requests. The Tracking Web Services component 225, in turn, interfaces with a PIPCS back-end Distributed Consensus Network and Transaction Data Store component 255 to fulfill these requests. Examples of this back-end component 255 are implemented on a public or private blockchain.

The Analytics Web Portal component 765 interfaces with a backend Online Analytical Processing (OLAP) Data Mart component 625 to fulfill its requests. This back-end component 625 has a data interface with the Distributed Consensus Network and Transaction Data Store component 255, whereby data from the component 255 is transferred into the Online Analytical Processing (OLAP) Data Mart component 625 and pre-processed into a form suitable to process data analytics requests.

The Admin Services Web Portal component 770 interfaces with the Authentication and Identity Management access-point component 110 to invoke code within PIPCS to service System and User Administration requests. The Authentication and Identity Management Access-point component 110, in turn, interfaces with the Authentication and Identity Management Services component 115 to fulfill these requests.

Figure 8:
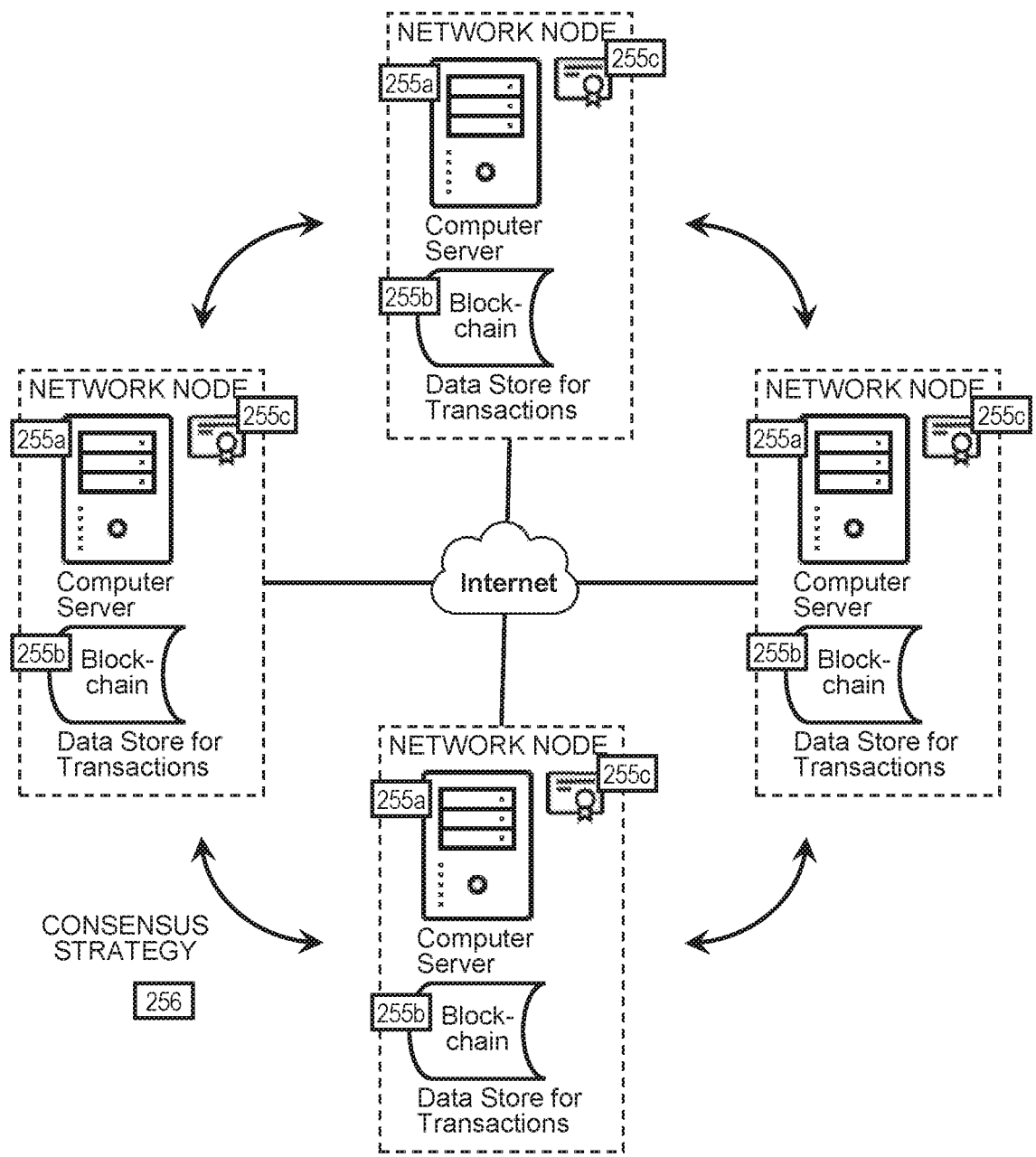
FIG. 8 is a schematic diagram of an example system for provenance and illicit product control utilizing a blockchain to store tracking information.

FIG. 8 shows an example of the back-end Distributed Consensus Network and Transaction Data Store component 255 in FIG. 7, implemented as a private blockchain. A component 255 is replicated over multiple nodes, where each node comprises a computer executing blockchain software 255a, a digital certificate authenticating the computer's identity 255c, and a data storage device containing a chain of data blocks made up of tracking transaction data 255b. The replicated nodes 255 are networked together and tracking transactions are sent to this network for processing and capture. The network uses a consensus algorithm to determine the correct ordering in which the transactions are captured, and validates the transactions, examples of which include proof of work, proof of stake, permissioned based voting, lottery based voting, proof of authority and directed acyclic graphs.

Figure 9:
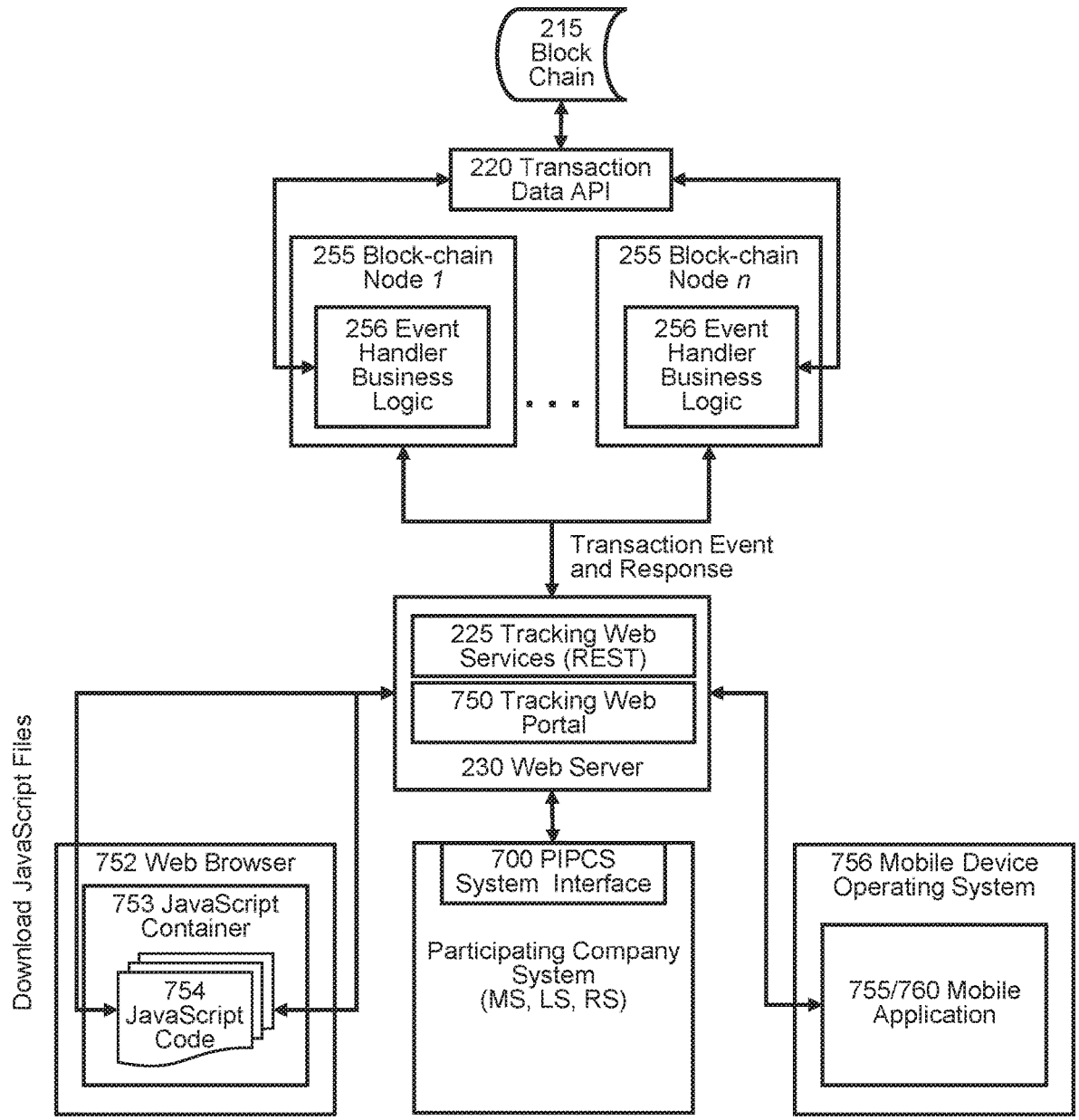
FIG. 9 is a schematic diagram of details of software components of an example system for provenance and illicit product control, the details including where business logic is executed.

FIG. 9 details the software components which execute on various computers and mobile electronic devices, and interact to comprise the tracking functions of PIPCS. Web browsers 752 executing on personal computers contain a Javascript Container 753, which interprets and executes source code 754 downloaded from a web server 230. This source code 754 generates the user interfaces of the Tracking system and sends requests to the web server 230. This web server 230 contains software which implements web services 225 utilizing industry-standard protocols, an example of which is Representational State Transfer Technology ("REST") services, and the Javascript code 754 invokes these web services 225 in order to make requests for data or to capture a tracking event.

Software systems at participating companies, such as a MS, LS or RS, integrate with a software component of PIPCS, which is its system interface 700. These software systems make requests of data or to execute functionality in PIPCS, and these requests are sent over the internet to a web server 230. This web server 230 contains software which implements web services 225, an example of which is REST, and the participating company software systems use this interface to invoke web services 225 in order to make requests for data or to capture a tracking event.

Individual users use mobile electronic devices, which are miniaturized computers, and which execute an operating system. The mobile electronic devices are installed with a component of PIPCS which is either a mobile application for end-consumers 755, or a mobile application for officials 760. These mobile applications generate the user interfaces of the Tracking System and send requests to the web server 230. This web server 230 contains software which utilizes industry standards for web services 225, an example of which is REST, and the mobile applications 755, 760 invoke these web services 225 in order to make requests for data or to capture a tracking event.

These web services 225, which are invoked either from a web browser 752, or a software system at a participating company 700, or from a mobile application 755, 760, pass on requests, to the network of blockchain nodes 255 (additional detail about the structure and processing of this network is provided in FIG. 8 and described above). Each node 255 is identical to every other node in the network, and is loaded with software which implements the PIPCS system's transaction level Event Handler Business Logic component 256. This business logic 256 accesses existing blockchain data through the Transaction Data API component 220, which directly accesses the chain of transaction blocks stored in a storage device 215. This business logic 256 uses the same API component 220 to write new transaction blocks to the storage device 215.

Figure 10:
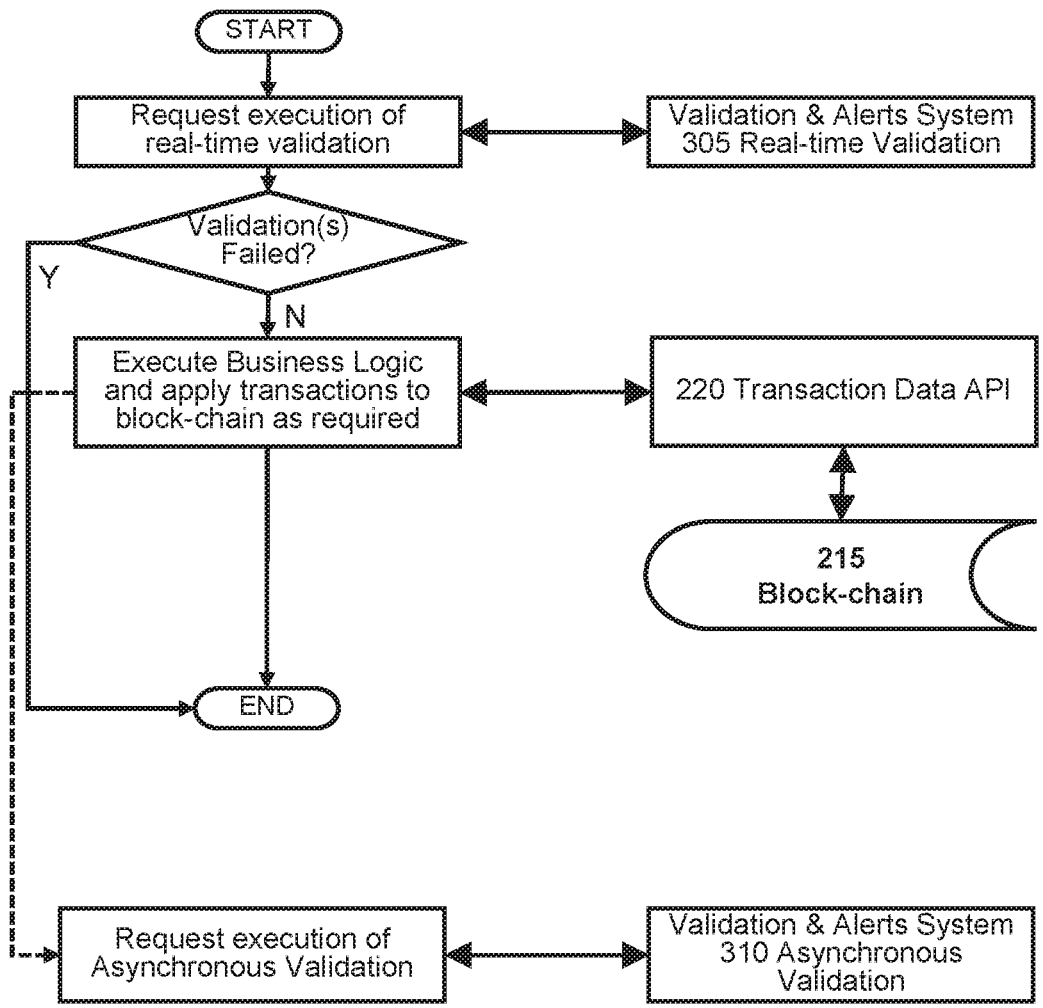
FIG. 10 is a flowchart of an example method to process a request or report of a legitimate event of creation, removal or transfer of products.

FIG. 10 focuses on the internal processing steps of the Event Handler Business Logic component (depicted in FIG. 9, 256 Event Handler Business Logic), which executes in each node of the blockchain network. The first step of this module determines the type of transaction event being processed and calls upon the Validation & Alerts System validation component 305 to execute the logic necessary the type of transaction event. If any of the validation has failed, the Event Handler Business Logic component returns execution control to the calling component, the Tracking Web Services 225 in FIG. 9, with the appropriate error messages. Otherwise, processing continues with the next step, where the business logic to process the transaction event is carried out. This logic has access to historical transactions captured in the blockchain, via the Transaction Data API component 220, which reads from the blockchain 215. It can also create new transaction records using the Transaction Data API component 220, which writes to the blockchain 215. If additional validation is required for this type of transaction event, which cannot be executed in real-time due to heavy processing requirements, provision is made to asynchronously execute these additional validations, by calling upon the Validation & Alerts System asynchronous validation component 310, and execution flow control is returned to the calling component. Once the asynchronous execution of the additional validation is completed in the Asynchronous validation component 310, and if any of the validations have failed, the appropriate error messages are returned to a listener in the calling component.

Some examples of transaction event Handlers are Request New Unique Identifiers ("UID"), Report Production of New Unit Products, Report Production of New Carton Products, Create a Shipment, Receive Shipment and Report Sale to End-consumer.

Figure 11:
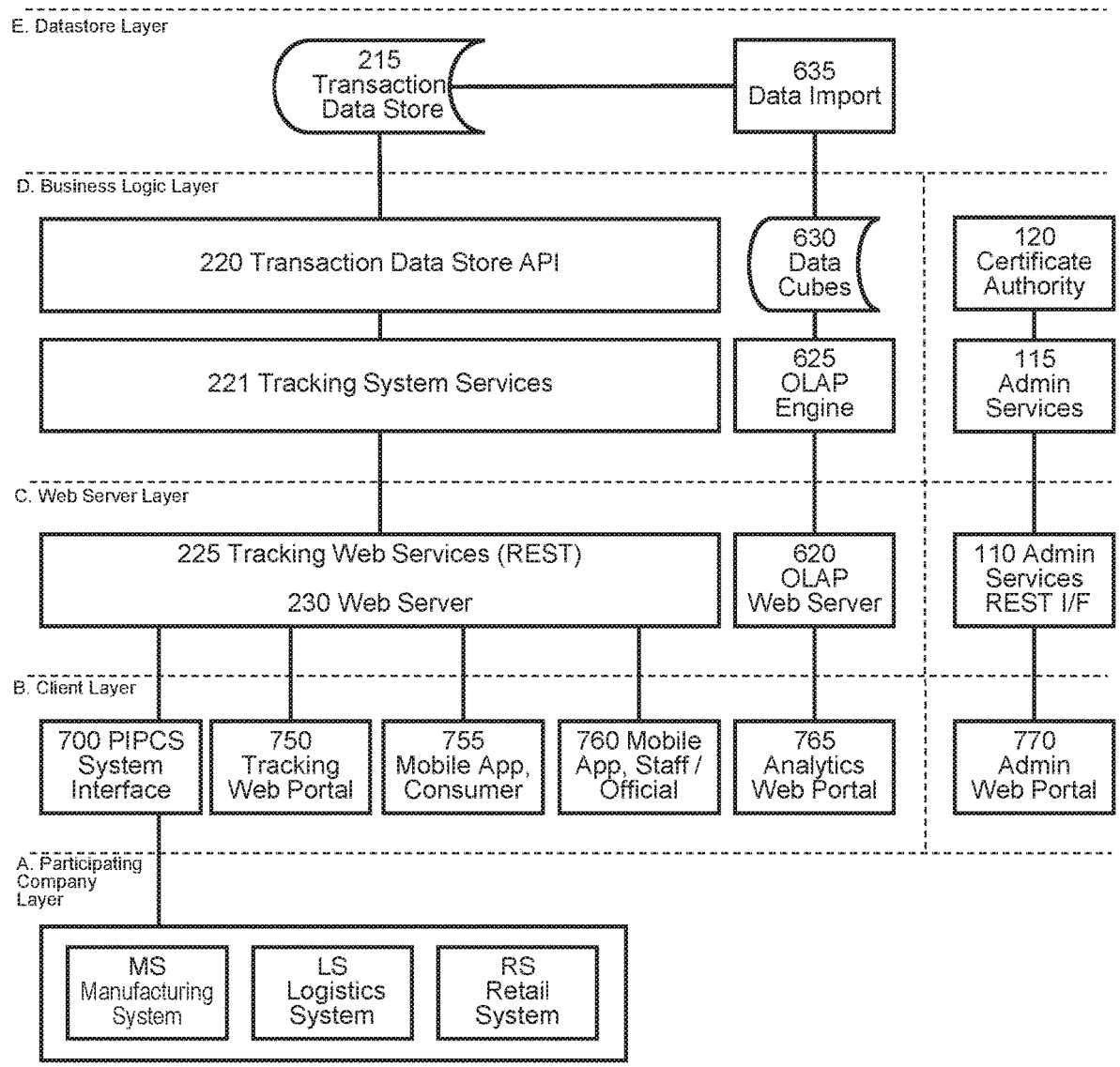
FIG. 11 is a schematic diagram of example software modules and logical tiers of a system for provenance and illicit product control.

FIG. 11 brings the software components of the PIPCS, together into one technical diagram. The diagram depicts horizontal layers, where each layer represents a different hardware and software platform, as well as a distinct level of abstraction. The Participating Company Layer ("A") represents the computer systems at the participating companies, the MS, the LS and RS.

The Client Layer ("B") represents the PIPCS components which are either user or systems interfaces into its functions. The PIPCS System Interface component 700 provides the systems interface whereby computer systems from Layer A can integrate with PIPCS. The Tracking Web Portal component 750 executes in a web browser within a personal computer and provides the user interface that authorized users can use to access the PIPCS tracking functions. The mobile application for end-consumers component 755 executes in a mobile electronic device and provides the user interface so that any user can scan a unique id on a product and retrieve a report on its legitimate chain of custody, or a warning of its invalidity. The mobile application for participating company staff and regulatory or law enforcement officials component 760 runs in a mobile electronic device and provides the user interface so that authorized users can call upon any level of tracking detail available to them based on their credentials. The Analytics Web Portal component 765 executes in a web browser within a personal computer and provides the user interface that authorized users can use to access advanced data analysis upon the PIPCS tracking data. The Admin Web Portal component 770 executes in a web browser within a personal computer and provides the user interface that authorized users can use to access system administration and user administration functions of PIPCS, the functionality being limited based on the level of authorization assigned to the user.

The Web Server Layer ("C") comprises the web servers that components in the previous layer (Client Layer B) interact with and make requests to. The Tracking Web Server 230 contains an example of the Tracking System Services REST Interface component, which intermediates the requests between the software components in Layer B and the software components in Layer D (see below) for the tracking functions of the PIPCS. The OLAP web server contains an example of the analytics services REST interface component, which intermediates the requests between the Analytics Web Portal component 765 in Layer B, and the OLAP Engine 625 in Layer D (see below). The Admin Web Portal 770 contains an example of the Admin Services REST Interface component, which intermediates the requests between the Admin Web Portal component 770 in Layer B, and the Admin Services component 115 Layer D (see below).

The Business Logic Layer ("D") comprises software components which implement the software algorithms required to process requests from the previous layers A, B and C. The Tracking System Services component 221 implements the software algorithms required to fulfill tracking requests, and invokes the Tracking Data Store API component 220 to interface with the Tracking Data Store component 215 in Layer E. The OLAP Engine component 625 implements the functionality required to fulfill data analytics query and navigation requests from the previous layers B and C, and accesses the data in Data Cubes component 630 as required. The Admin Services component 115 implements the software algorithms required to service requests from previous layers B and C to perform system configuration changes upon the network structure, upon individual computer systems that comprise PIPCS, and upon lists of authorized users and their privileges within the system. It interacts with the Certificate Authority component 120 to make changes to the digital certificates registry, to carry out requests related to identity of computer systems or authorized users within the PIPCS system network.

In the Database Layer ("E"), the Data Import component 635 is responsible for retrieving tracking data from the Transaction Data Store component 215, pre-processing it to facilitate data queries, and updating the data within the Data Cubes component 630 in Layer D.

Figure 12:
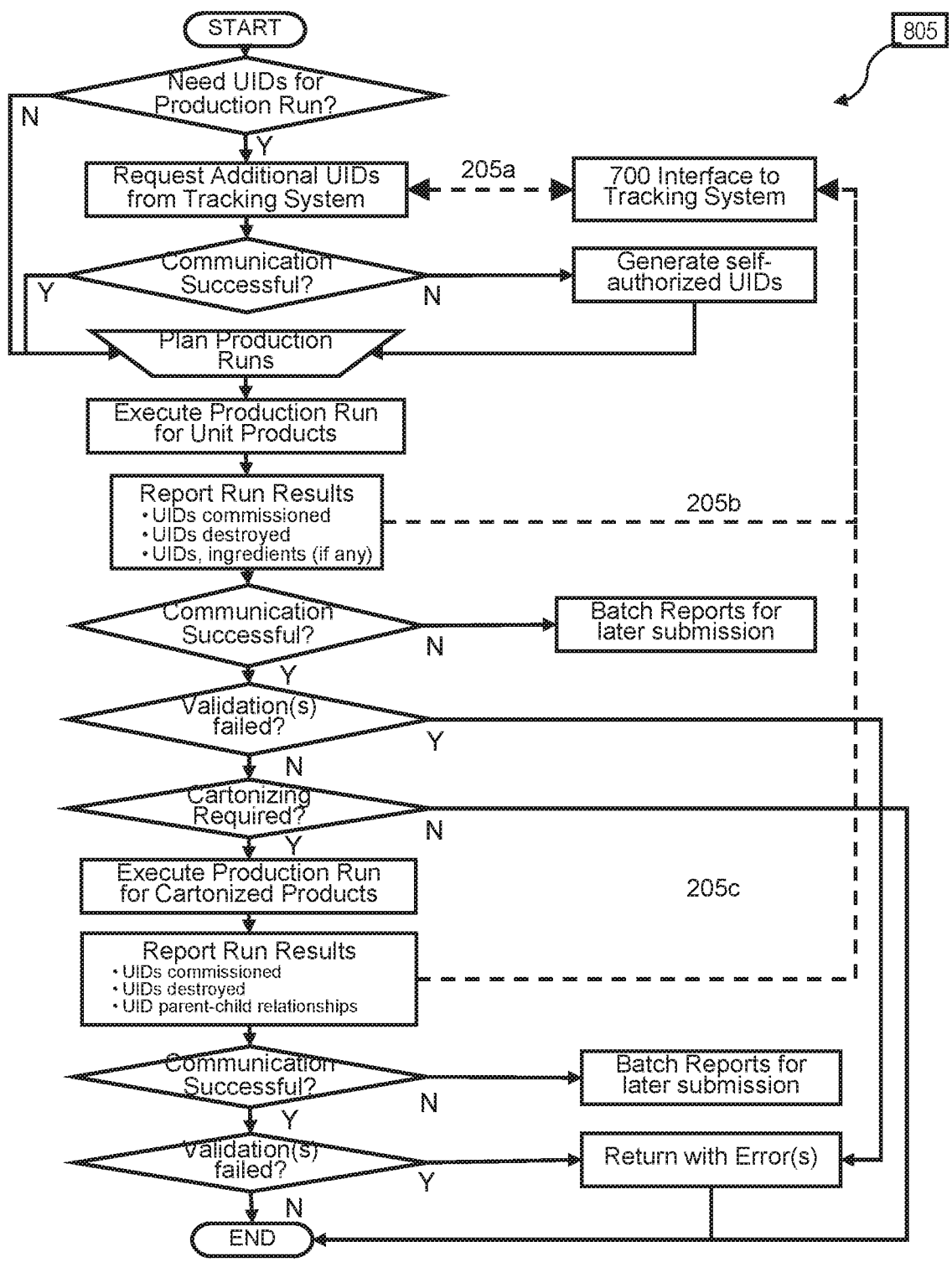
FIG. 12 is a flowchart of an example method to tag newly produced items with unique identifiers at a producing company.

FIG. 12, representing New Production 805 in FIG. 3 and FIG. 4, details the workflow used, by participating companies who produce (manufacture, produce, cultivate, harvest, mine), to tag newly produced goods with unique identifiers authorized by the PIPCS. The workflow describes the various production planning and production execution steps. First, if there are an insufficient number of unassigned unique identifiers available for the upcoming production run, the MS at the participating company uses the Interface to Tracking System component 700 to request PIPCS to generate additional unique identifiers for use with individual products or aggregate (carton) products. Once a production run is executed, the MS uses the Interface to Tracking System component 700 to report the unique identifiers which were commissioned and provides details about the product. It also reports any unique identifiers which were spoiled in the manufacturing process. The PIPCS applies various validation rules upon the report, examples of which are, confirming that the reported commissioned unique identifiers were previously issued by PIPCS, confirming that the time elapsed between the issuance date and the commissioned date is no greater than a configured value, ensuring that there is no gap between commissioned and destroyed unique identifiers reported in the previous report and the current report.

If the MS is not able to communicate with PIPCS when requesting the generation of unique identifiers, it will generate the unique identifiers itself using a prescribed algorithm, and will prepare a report containing the unique identifiers, together with supervisory approval, to be sent to PIPCS when communication is re-established.

If the MS is not able to communicate with PIPCS when reporting the commissioned and spoiled unique identifiers, it will store the report, and send it when communications are re-established.

Figure 13:
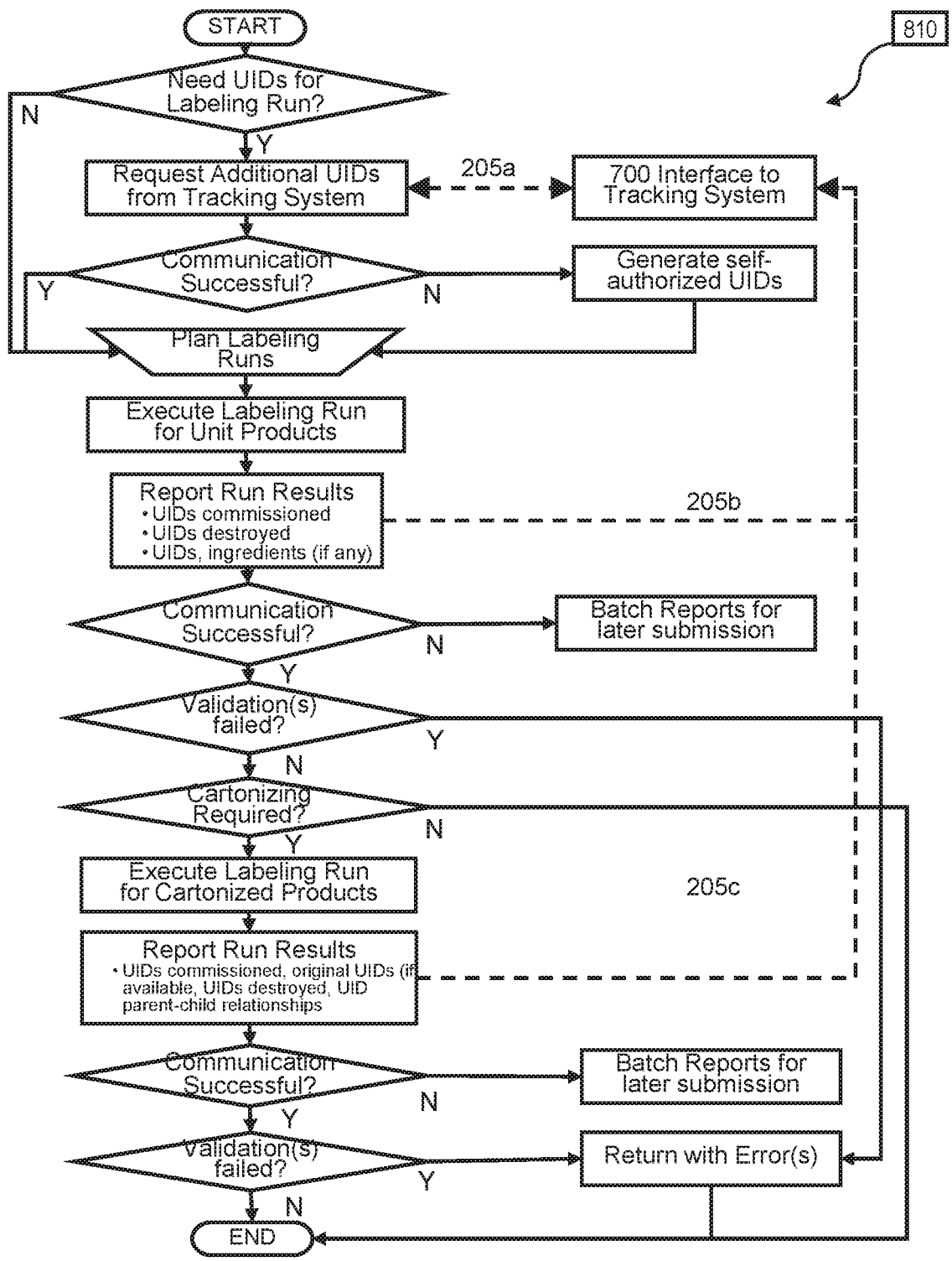
FIG. 13 is a flowchart of an example method tag newly arrived items with unique identifiers at an intake company.

FIG. 13, representing Intake of Products 810 in FIGS. 3 and 4, details the workflow used by participating companies who intake products from companies which are not participating companies of PIPCS, whether or not the shipping company is in a different jurisdiction. (Alternately, when participating companies import products from other participating companies from other jurisdictions, they use the workflow represented in FIG. 15, Receiving products 820). The workflow in FIG. 13 describes how an intake company tags intake products with unique identifiers authorized by the PIPCS, by detailing out the labeling planning and execution steps. First, if there are an insufficient number of unassigned unique identifiers available for the upcoming labeling run, the MS at the participating company uses the Interface to Tracking System component 700 to request PIPCS to generate additional unique identifiers for use with individual products or aggregate (carton) products. Once a labeling run is executed, the MS uses the Interface to Tracking System component 700 to report the unique identifiers which were commissioned and provides details about the product. It also reports any unique identifiers which were spoiled in the labeling process. The PIPCS applies various validation rules upon the report, examples of which are, confirming that the reported commissioned unique identifiers were previously issued by PIPCS, confirming that the time elapsed between the issuance date and the commissioned date is no greater than a configured value, ensuring that there is no gap between commissioned and destroyed unique identifiers reported in the previous report and the current report.

If the MS is not able to communicate with PIPCS when requesting the generation of unique identifiers, it will generate the unique identifiers itself using a prescribed algorithm, and will prepare a report containing the unique identifiers, and supervisory approval, to be sent to PIPCS when communication is re-established.

If the MS is not able to communicate with PIPCS when reporting the commissioned and spoiled unique identifiers, it will store the report, and send it when communications are re-established.

Figure 14:
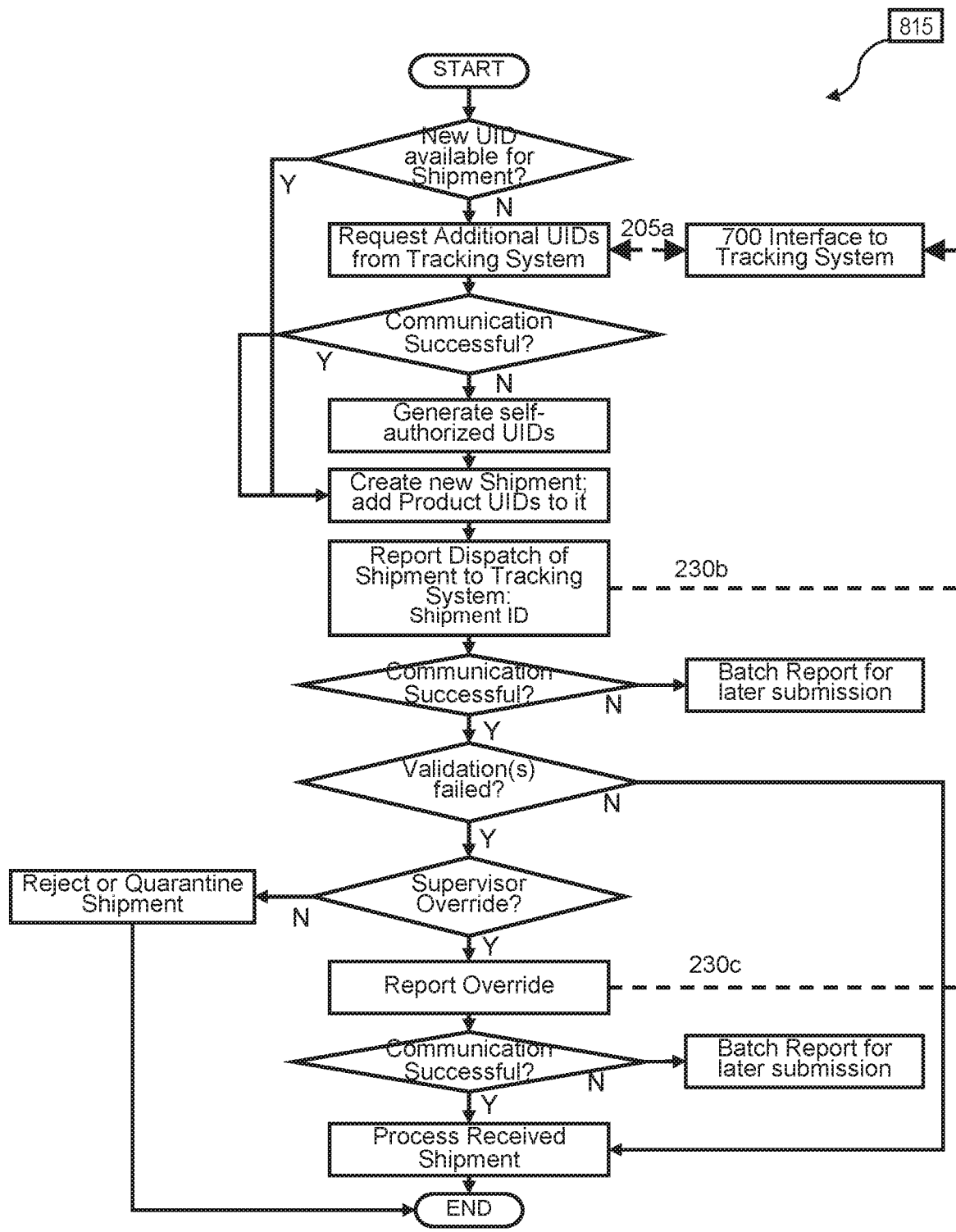
FIG. 14 is a flowchart of an example method to report the creation and dispatching of a product shipment at a company.

FIG. 14, representing Shipping 815 in FIGS. 3 and 4, details the workflow used by participating companies who ship products to other participating companies within PIPCS. It describes how a participating company tags a product shipment with a unique identifier authorized by PIPCS adds products to the shipment and reports this new shipment to PIPCS. First, if an unassigned unique identifier is not available for the new shipment, the LS at the participating company uses the Interface to Tracking System component 700 to request PIPCS to generate additional unique identifiers for use to tag shipments. Once a shipment is created and dispatched, the LS uses the Interface to Tracking System component 700 to report the newly commissioned unique identifier, and provide details about the shipment, including the unique identifiers of the products included in the shipment. The PIPCS applies various validation rules upon the report, examples of which are, confirming that the reported commissioned unique identifier for the shipment was previously issued by PIPCS, confirming that the unique identifiers of the products added to the shipment represent products which are on PIPCS's record as being in the inventory of the shipping participating company and available for shipment. If PIPCS evaluates a validation rule as failed, the configuration associated with the validation rule will determine if the shipping participating company is permitted to proceed with the shipment using a supervisory override. Otherwise, the shipment is quarantined. If a supervisory override is executed, this information is transmitted to PIPCS, which captures the information in the blockchain and automatically alerts appropriate regulators.

If the LS is not able to communicate with PIPCS when requesting the generation of unique identifiers, it will generate the unique identifiers itself using a prescribed algorithm, and will prepare a report containing the unique identifiers, and supervisory approval, to be sent to PIPCS when communication is re-established.

If the LS is not able to communicate with PIPCS when reporting the shipment, it will store the report, and send it when communications are re-established.

Figure 15:
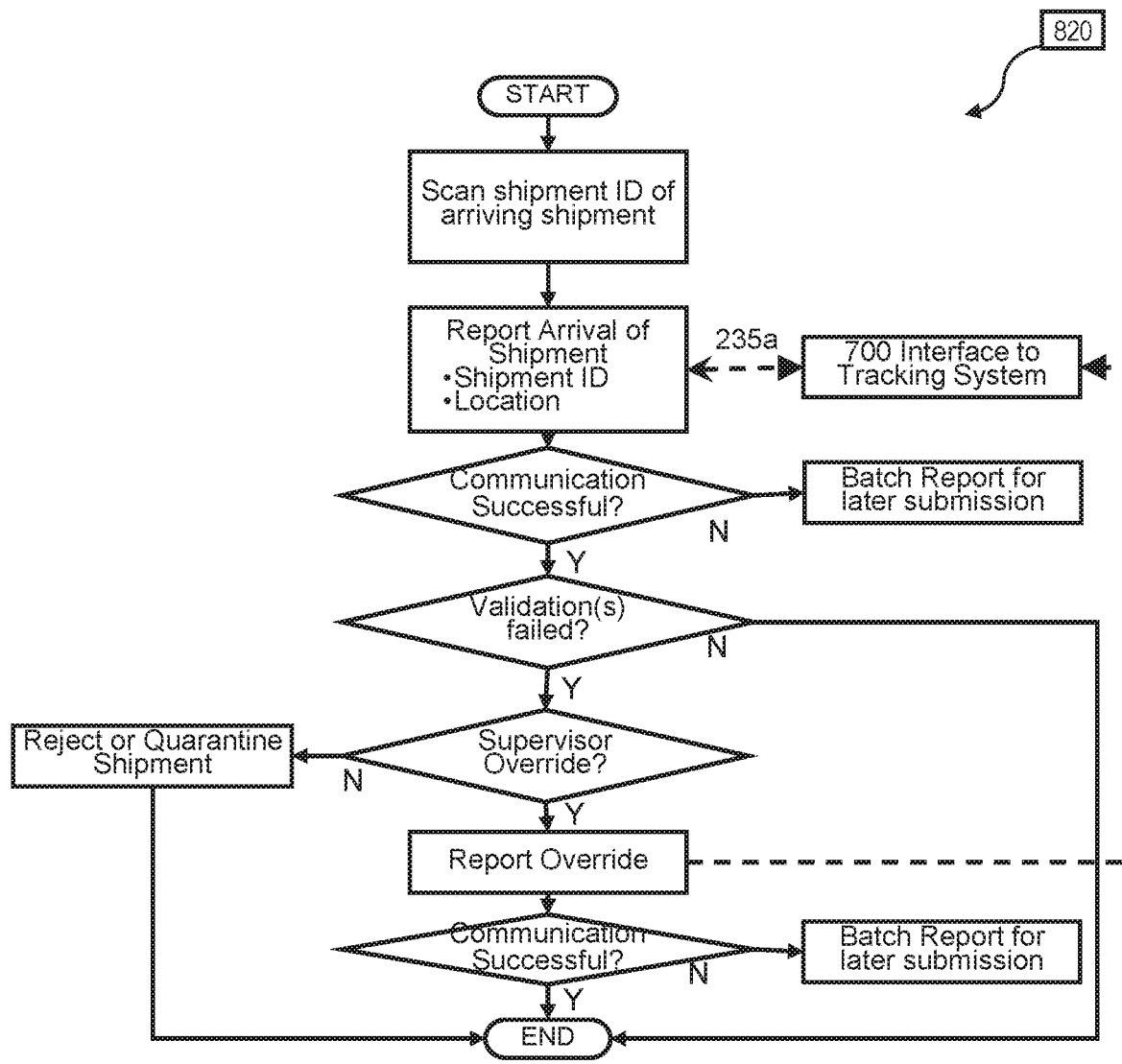
FIG. 15 is a flowchart of an example method to report the receipt of a shipment at a company.

FIG. 15, representing Receiving 820 in FIGS. 3 and 4, details the workflow used by participating companies who receive products to other participating companies within PIPCS. It describes how a participating company scans the unique identifier on the product shipment which was authorized by PIPCS reports the receipt of this shipment to PIPCS, and transfers custody of the included products to the receiving participating company. The PIPCS applies various validation rules upon the report, examples of which are, confirming that the shipment represented by the unique identifier scanned is on PIPCS's record as having been shipped to the receiving participating company, that the shipment is on record as being in transit, and that the time between shipment and receipt is no greater than a configured value.

If the LS is not able to communicate with PIPCS when requesting the validation of the shipment, it will prepare a report containing the unique identifier of the shipment, and supervisory approval, to be sent to PIPCS when communication is re-established.

Figure 16:
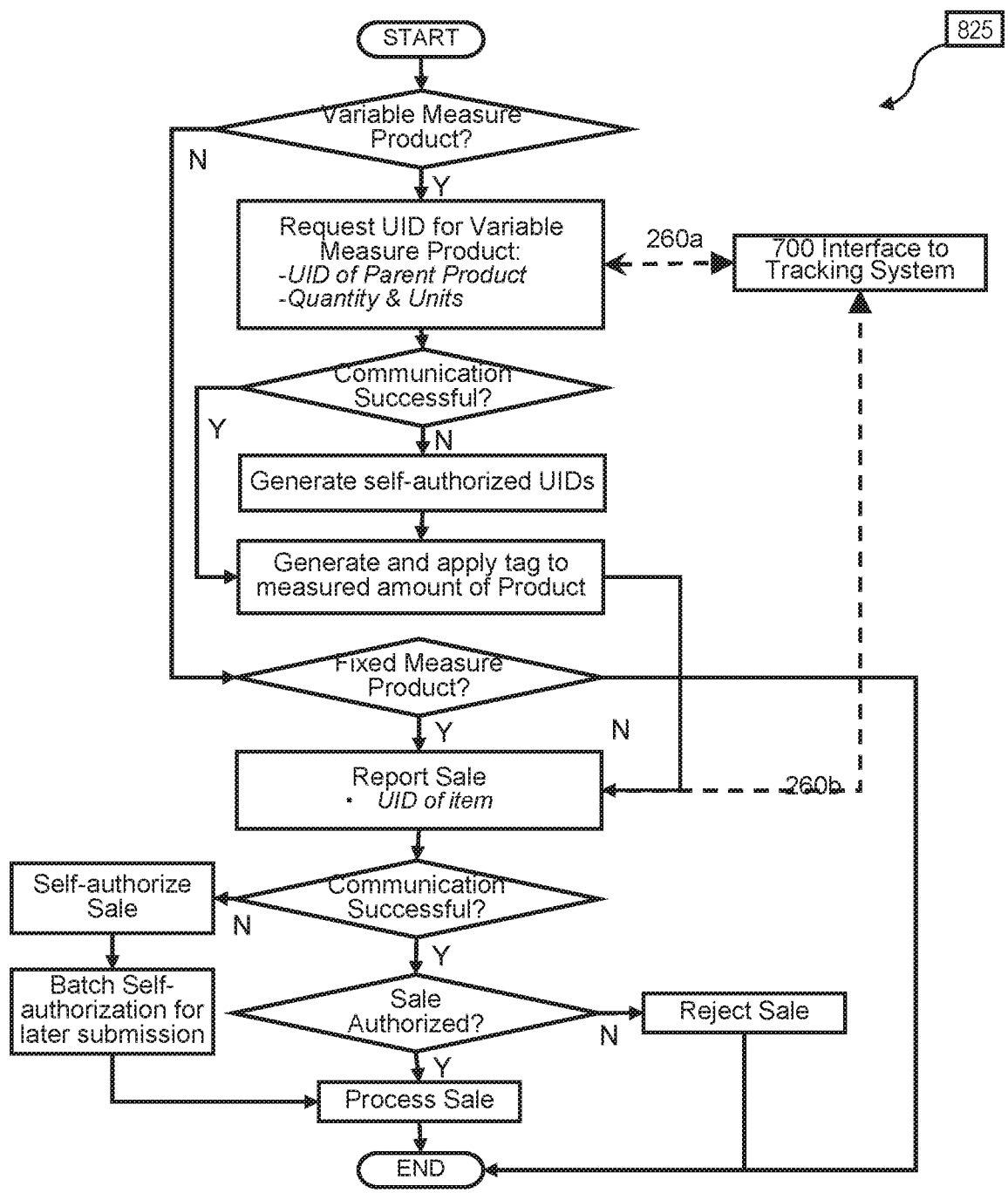
FIG. 16 is a flowchart of an example method to report the sale of products to an end customer at a retail company.

FIG. 16, representing Sale of Product to End-consumer 825 in FIGS. 3 and 4, details the workflow used by participating retail companies who sell products to the end-consumer. It describes how a participating company processes the sale of variable-measure and fixed-measure products within PIPCS.

For variable-measure products, it describes how the participating company's RS sends a request to the Provenance and Illicit Activity Control System, containing the unique identifier of the product from which a variable quantity is to be removed for sale, and the quantity of the product to be sold. The PIPCS responds with a new unique identifier for the variable portion to be sold.

For fixed-measure products, it describes how the participating company's RS sends a request to validate the sale, containing the unique identifier(s) of the product(s) to be sold.

The present PIPCS applies various validation rules upon the requests, examples of which are, confirming that PIPCS records indicate that the source product, from which a variable quantity is to be removed, has sufficient quantity remaining to fulfill the request, confirming that the unique identifier of a fixed-quantity product to be sold is on PIPCS's record as being in the inventory of the participating company, at the location at which the sale is taking place, and is available for sale.

If the RS is not able to communicate with PIPCS when requesting the generation of a unique identifier for the variable-quantity sale, it will generate the unique identifier itself using a prescribed algorithm, and will prepare a report containing the unique identifier, together with supervisory approval, to be sent to PIPCS when communication is re-established. Similarly, if RS is not able to communicate with PIPCS when requesting validation of a fixed-quantity sale, it will capture the sale details, together with supervisor approval, and store the report, and send it when communications are re-established.

Figure 17:
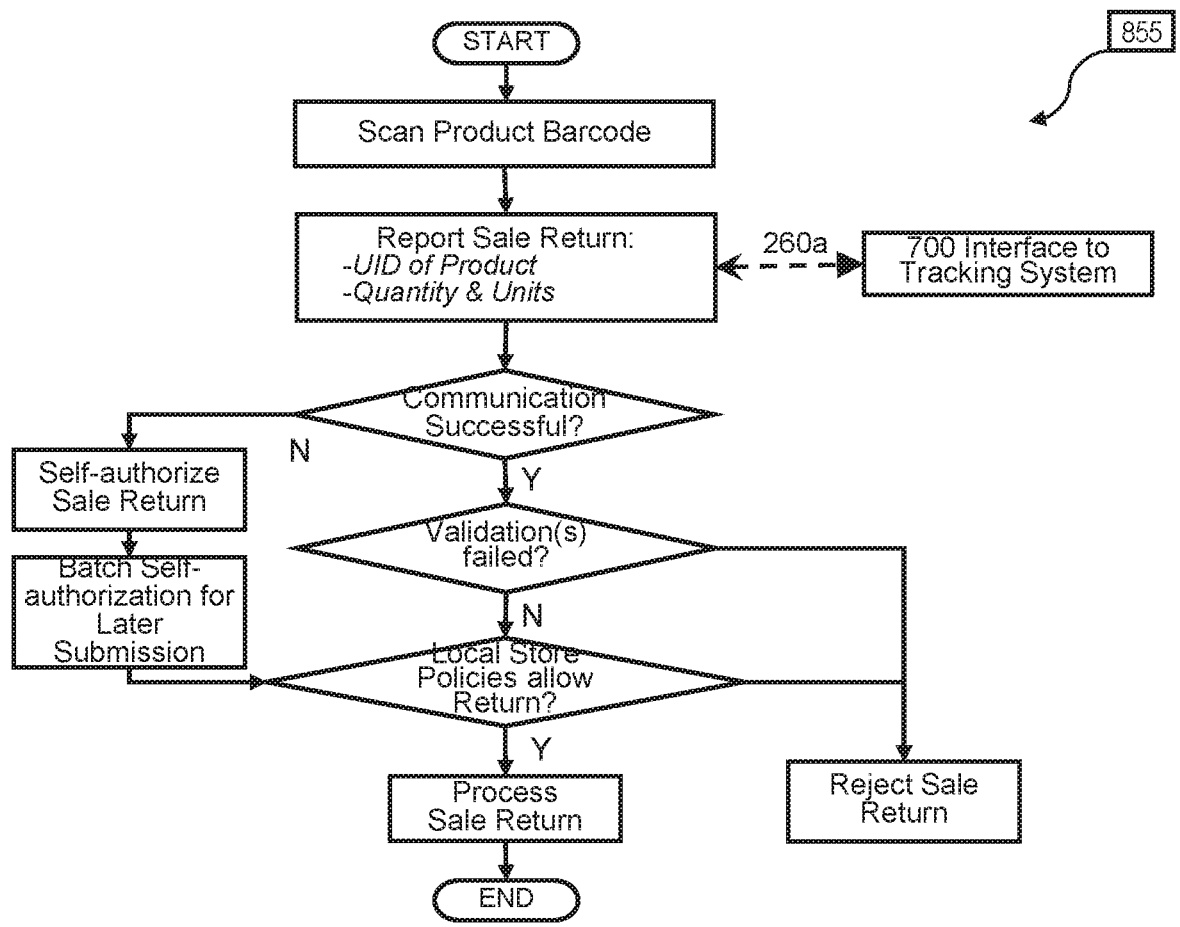
FIG. 17 is a flowchart of an example method to report the sale return of products from an end customer at a retail company.

FIG. 17, representing Sale Return from End-consumer 855 in FIGS. 3 and 4, details the workflow used by participating retail companies who sell products to the end-consumer. It describes how a participating company processes the sale return of products within PIPCS.

It describes how the participating company's RS sends a request to validate the sale return, containing the unique identifier(s) of the product(s) to be returned. The PIPCS applies various validation rules upon the requests, examples of which are, confirming that PIPCS records indicate that the unique identifier representing the item to be returned is on PIPCS's record as being sold by the participating company, at the location at which the sale is taking place, and that the time period between sale and sale return is no greater than a configured value.

If the RS is not able to communicate with PIPCS when requesting the generation of a unique identifier for the variable-quantity sale, it will generate the unique identifier itself using a prescribed algorithm, and will prepare a report containing the unique identifier, together with supervisory approval, to be sent to PIPCS when communication is re-established. Similarly, if RS is not able to communicate with PIPCS when requesting validation of a fixed-quantity sale, it will capture the sale details, together with supervisor approval, and store the report, and send it when communications are re-established.

Figure 18:
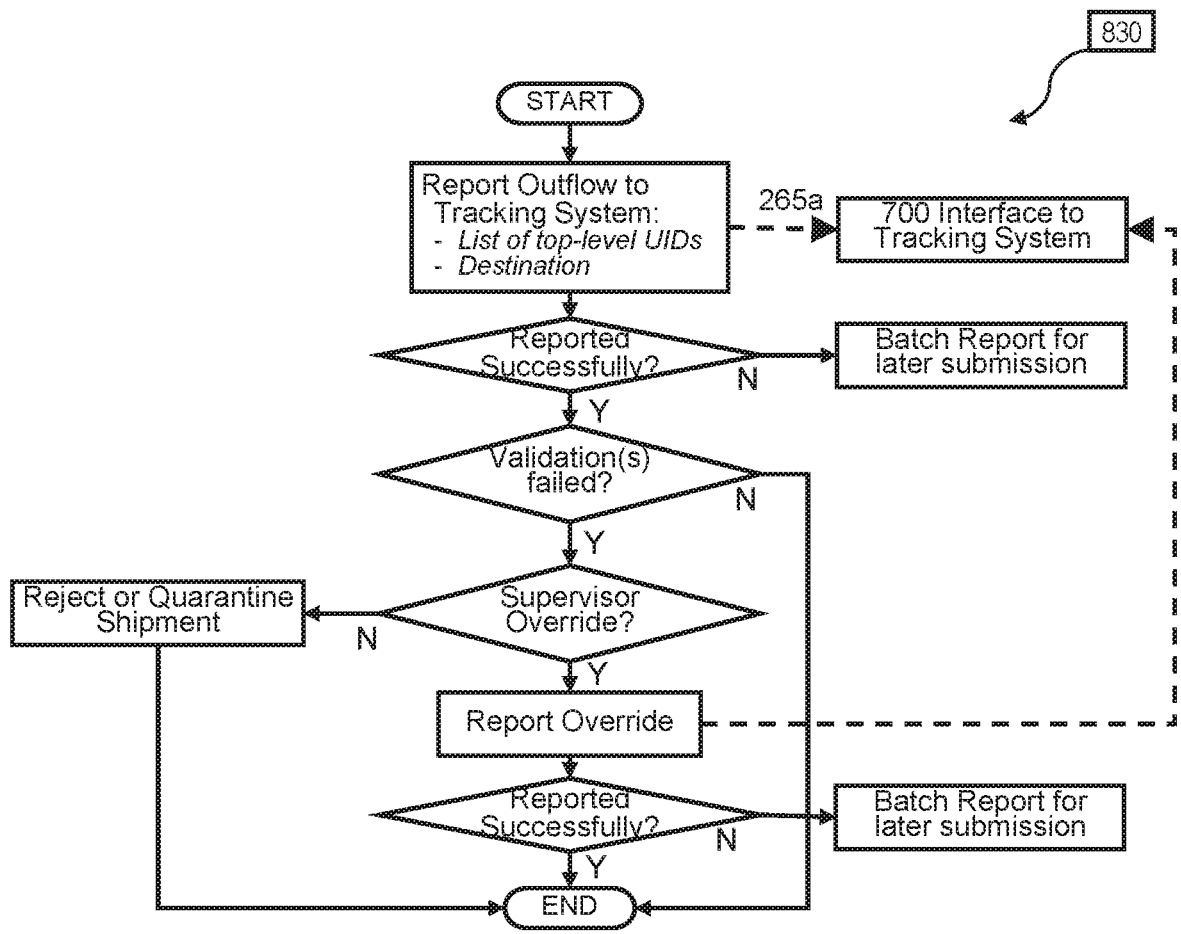
FIG. 18 is a flowchart of an example method to report the outflow of products from an outflow company.

FIG. 18, representing Outflow of Products 830 in FIGS. 3 and 4, details the workflow used by participating companies who ship products to companies not which are not participating within PIPCS, or to companies in other jurisdictions, which may be participating in another instance of PIPCS. It describes how a participating company tags a product shipment with a unique identifier authorized by the PIPCS, adds products to the shipment and reports this new shipment to PIPCS. First, if an unassigned unique identifier is not available for the new shipment, the LS at the participating company uses the Interface to Tracking System component 700 to request PIPCS to generate additional unique identifiers for use to tag shipments. Once a shipment is created and dispatched, the LS uses the Interface to Tracking System component 700 to report the newly commissioned unique identifier, and provide details about the shipment, including the unique identifiers of the products included in the shipment. The PIPCS applies various validation rules upon the report, examples of which are, confirming that the reported commissioned unique identifier for the shipment was previously issued by PIPCS, confirming that the unique identifiers of the products added to the shipment represent products which are on PIPCS's record as being in the inventory of the shipping participating company and available for shipment. If PIPCS evaluates a validation rule as failed, the configuration associated with the validation rule will determine if the shipping participating company is permitted to proceed with the shipment using a supervisory override. Otherwise, the shipment is quarantined. If a supervisory override is executed, this information is transmitted to PIPCS, which captures the information in the blockchain and automatically alerts appropriate regulators.

If the LS is not able to communicate with PIPCS when requesting the generation of unique identifiers, it will generate the unique identifiers itself using a prescribed algorithm, and will prepare a report containing the unique identifiers, and supervisory approval, to be sent to PIPCS when communication is re-established.

If the LS is not able to communicate with PIPCS when reporting the shipment, it will store the report, and send it when communications are re-established.

Figure 19:
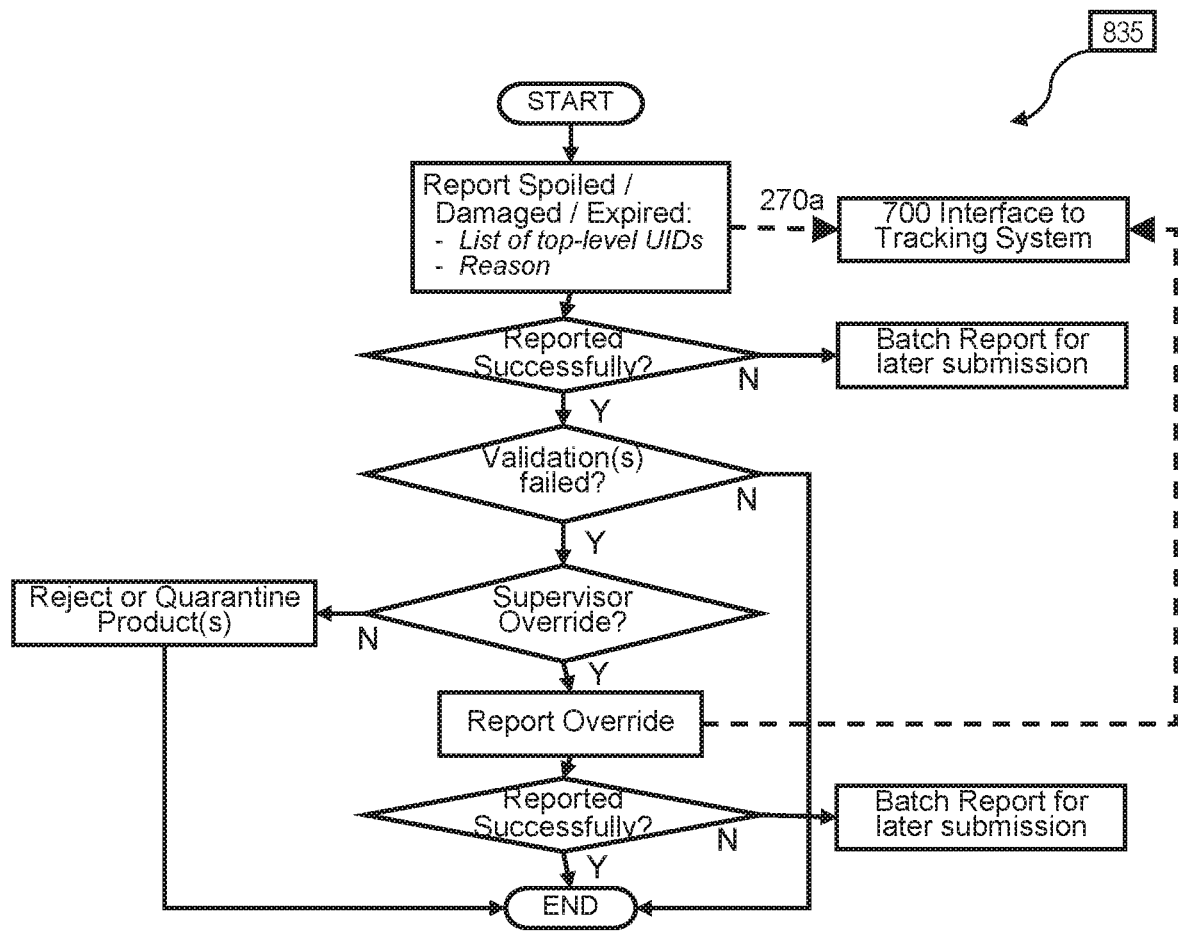
FIG. 19 is a flowchart of an example method to report spoiled, damaged or expired products at a company.

FIG. 19, representing Spoiled, Damaged or Expired Products 835 in FIGS. 3 and 4, details the workflow used by participating companies to dealing with products lost due to expiry, spoilage or damage. It describes how a participating company reports this event to PIPCS. The LS uses the Interface to Tracking System component 700 to report the loss of products and provide details, including the unique identifiers of the products involved. The PIPCS applies various validation rules upon the report, examples of which are, confirming that the unique identifiers of the products reported as lost represent products which are on PIPCS's record as being in the inventory of the participating company. If PIPCS evaluates a validation rule as failed, the configuration associated with the validation rule will determine the parties to be informed of this event, and whether this event warrants further investigation.

If the LS is not able to communicate with PIPCS when reporting the loss, it will store the report, and send it when communications are re-established.

Figure 20:
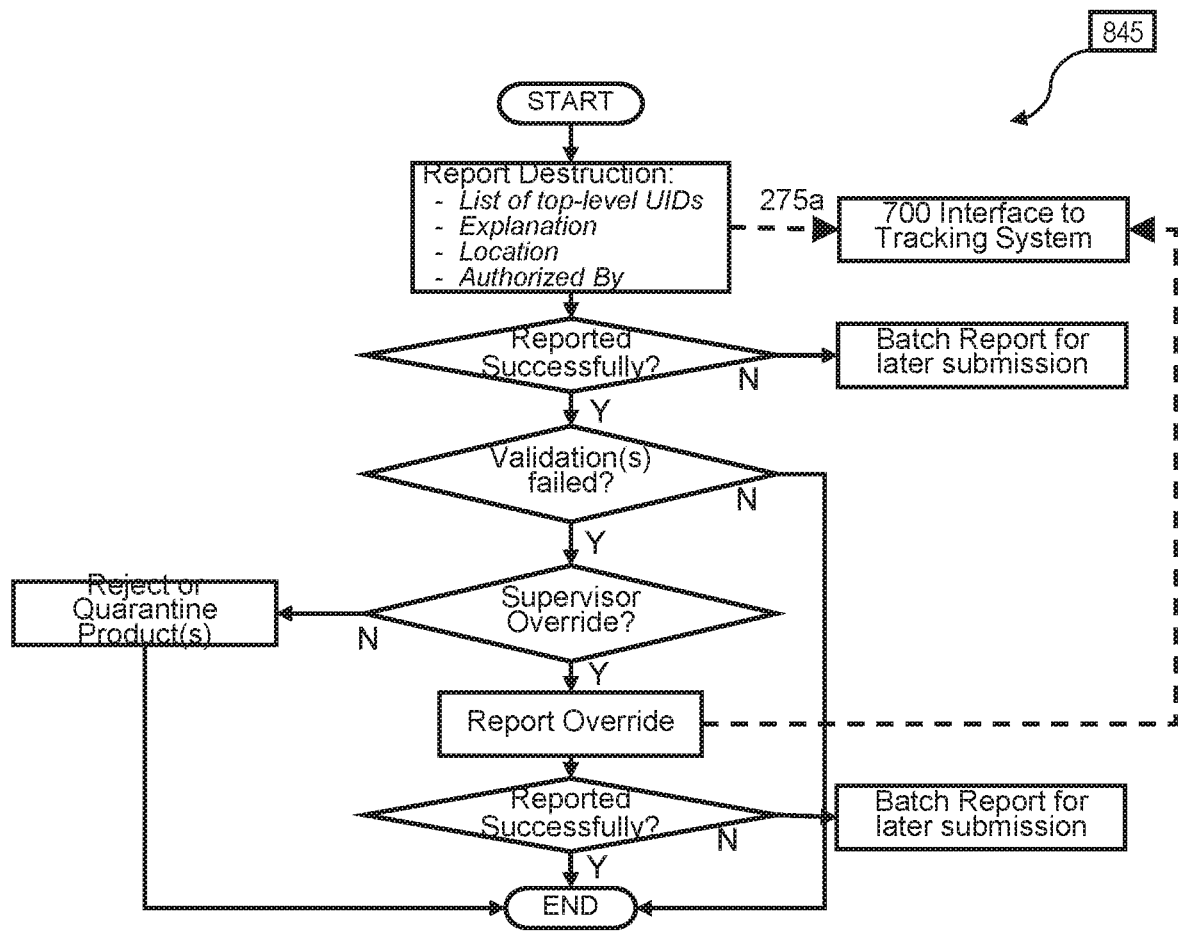
FIG. 20 is a flowchart of an example method to report the planned destruction of products at a company.

FIG. 20, representing Planned Destruction 845 in FIGS. 3 and 4, details the workflow used by participating companies who, being authorized to dispose of products, receive shipments for this purpose from other participating companies within PIPCS. It describes how a participating company authorized to dispose of products, reports the unique identifiers for the products submitted for planned destruction, to PIPCS. The PIPCS applies various validation rules upon the report, examples of which are, confirming that the unique identifiers of the products submitted for destruction represent products which are on PIPCS's record as being in the inventory of the shipping participating company and available for shipment. If PIPCS evaluates a validation rule as failed, the configuration associated with the validation rule will determine if the participating company is permitted to proceed with the disposal using a supervisory override. Otherwise, the shipment is quarantined. If a supervisory override is executed, this information is transmitted to PIPCS, which captures the information in the blockchain and automatically alerts appropriate regulators.

If the LS is not able to communicate with PIPCS when reporting the planned disposal, it will defer the disposal until such time as it is able to re-establish communications and obtain authorization.

Figure 21:
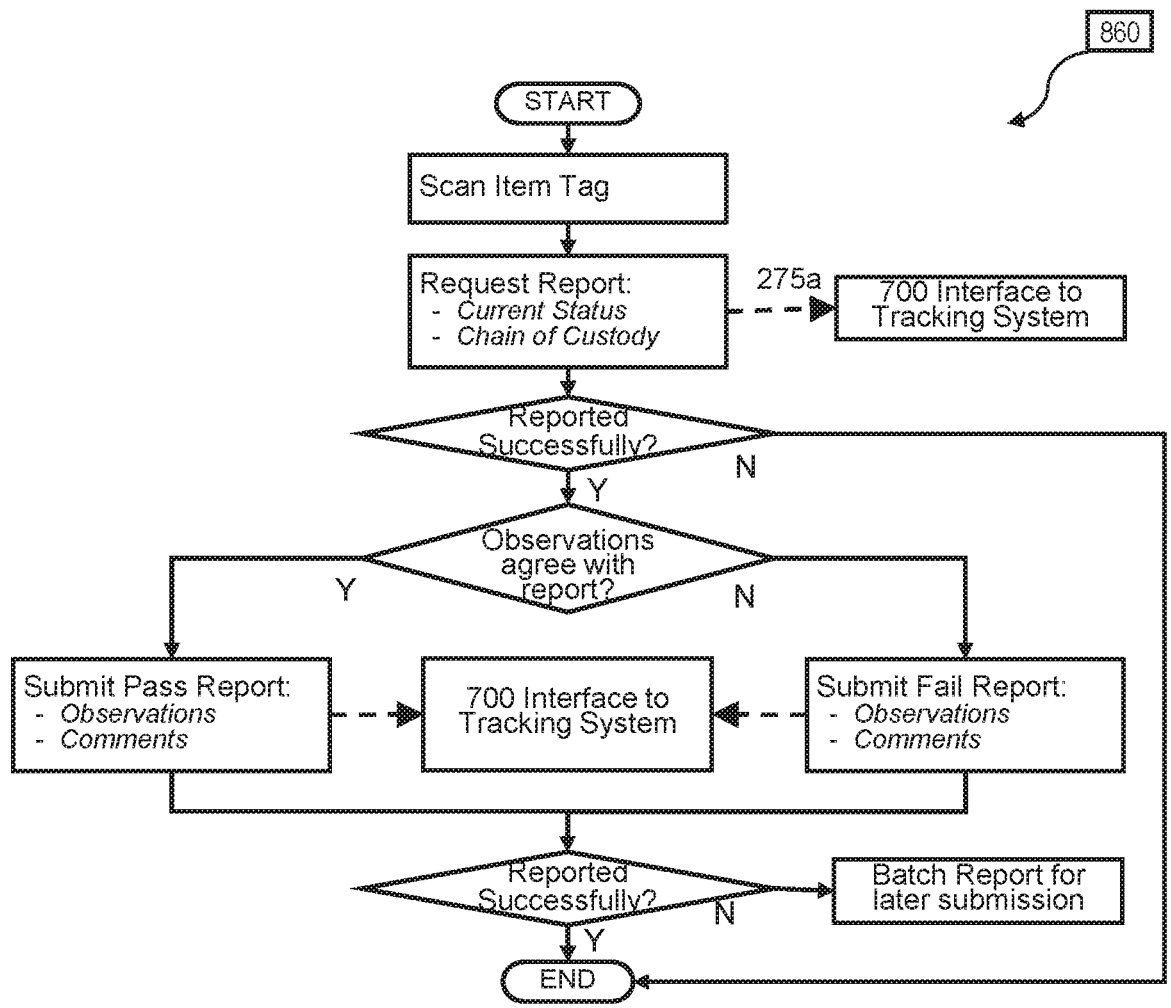
FIG. 21 is a flowchart of an example method, whether at a participating company location or otherwise, to perform a random audit on products.

FIG. 21, representing Random Audit 860 in FIG. 3, details the workflow used by officials, representing regulators or law enforcement agencies, who have the authority to perform random inspections of products to validate their status with PIPCS. It describes how the official uses a mobile electronic device and a software component, Mobile Application for Staff or Official (760 in FIG. 11), to scan the product tag of an item selected for inspection, to obtain its unique identifier. The software component, Mobile Application for Staff or Official (760 in FIG. 11), uses the Interface to Tracking System component 700, to request a report for the unique identifier, containing its current status, and its chain of custody from initial production. The PIPCS applies various validation rules upon the supplied unique identifier, examples of which are, validating the structure of the identifier and confirming that the identifier is on PIPCS's record as having existed. If found to be valid, PIPCS generates and returns the requested reports to the calling software component, and otherwise returns error messages. The official then compares actual observations to the reported status and details, and uses the software component, Mobile Application for Staff or Official (760 in FIG. 11), to create an audit report containing observations, any differences with reported status and details, and additional comments. The official submits the audit report using software component 760 (in FIG. 11), which uses the interface software component 700 to send the report to PIPCS. The PIPCS examines the audit report, and if discrepancies are found, uses the configuration associated with this event to determine the specific parties to inform about this event and the specific actions to take.

If the mobile electronic device, executing the software component Mobile Application for Staff or Official (760 in FIG. 11), is not able to communicate with PIPCS when reporting the audit results, it will store the report until such time as it is able to re-establish communications and re-submit.

Figure 22:
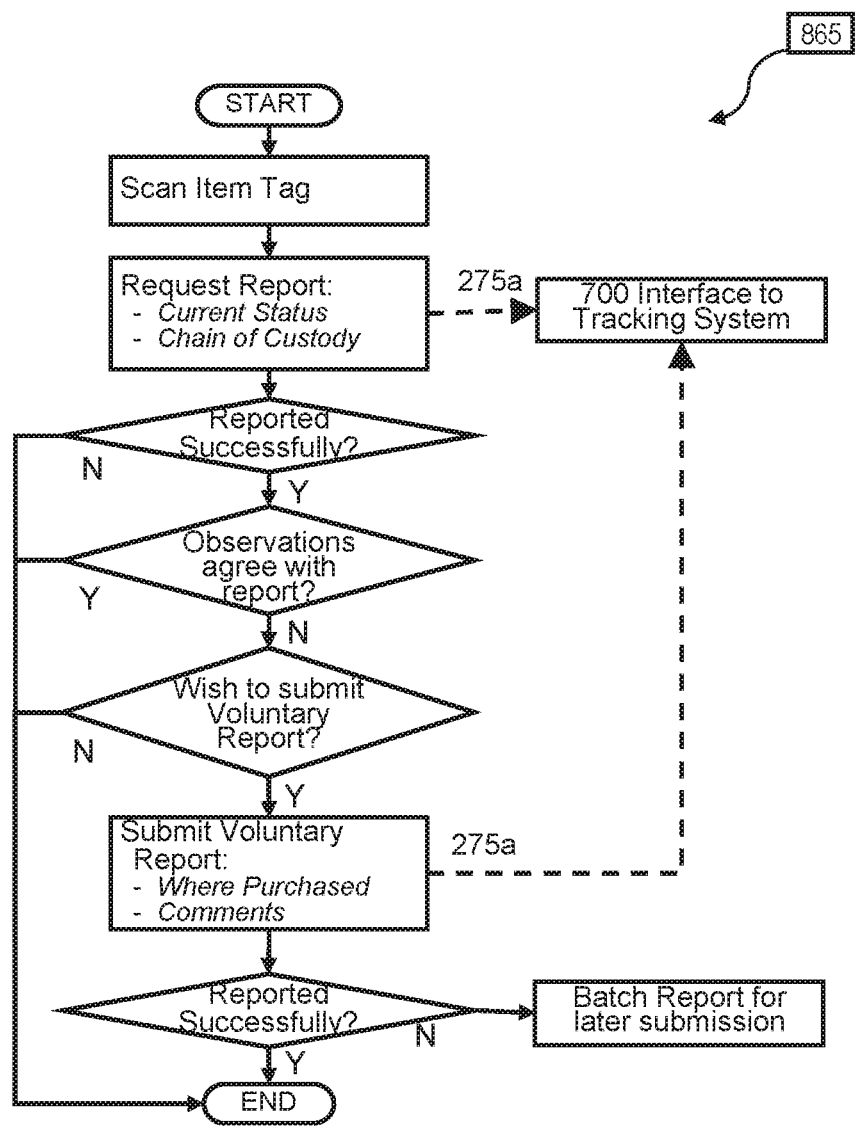
FIG. 22 is a flowchart of an example method to request a system for provenance and illicit product control to validate a given individual item, and if found to be suspicious, to provide additional details about it for further investigation.

FIG. 22, representing Voluntary Reporting 865 in FIG. 3, details the workflow used by a consumer to validate the authenticity and status of a given product item with PIPCS. It describes how the consumer uses a mobile electronic device and a software component, Mobile Application for Consumer (755 in FIG. 11), to scan the product tag of an item, to obtain its unique identifier. The software component, Mobile Application for Consumer (755 in FIG. 11), uses the Interface to Tracking System component 700, to request a report for the unique identifier, containing its current status, and its chain of custody from initial production. The PIPCS applies various validation rules upon the supplied unique identifier, examples of which are, validating the structure of the identifier and confirming that the identifier is on PIPCS's record as having existed. If found to be valid, PIPCS generates and returns the requested reports to the calling software component, and otherwise returns error messages. The consumer then compares actual observations to the reported status and details, and if discrepancies are found and the consumer chooses to submit a voluntary report about the discrepancies, uses the software component, Mobile Application for Consumer (755 in FIG. 11), to create a report containing observations about the observed differences with reported status and details, and additional comments. The consumer submits the report using software component 755 (in FIG. 11), which uses the interface software component 700 to send the report to PIPCS. The PIPCS uses the configuration associated with this event to determine the specific parties to inform about this event and the specific actions to take.

If the mobile electronic device, executing the software component Mobile Application for Consumer (755 in FIG. 11), is not able to communicate with PIPCS when reporting the voluntary report, it will store the report until such time as it is able to re-establish communications and re-submit.

FIG. 23 describes the structure of the unique identifier which the PIPCS assigns to each individual item or aggregate item of product within an industry, and uses to track that item from its inception, entry into the industry, to its exit, consumption or destruction. In the PIPCS, the generation of new unique identifiers is handled by PIPCS to minimize opportunity for the insertion of counterfeit products into the industry tagged with valid unique identifiers. The unique identifier is composed of three elements, the company identifier of the company which originally produces or intakes the product, a sequentially generated serial number, and a random string. Some examples of the unique identifier could be compatible with industry standards for such values, such as those required by the GS1 Standard (www.gs1.org).

The random string element of the unique identifier is generated using a cryptographically secure pseudo-random number generator software algorithm, some examples of which are the Yarrow Algorithm, or the Fortuna Algorithm, such that it becomes very difficult to independently predict the sequence of random numbers that will be generated.

If a participating company, when processing new products or intake products as per the workflow described in FIG. 12, Supply Chain Process for Producers 805, or FIG. 13, Supply Chain Process for Intake 810, is unable to contact PIPCS, such as due to communication failure, the participating company will be authorized to generate its own unique identifiers such that business activity is not adversely affected. However, such events will be flagged for close examination by regulators.

FIG. 24 illustrates example tracking data captured for various product tracking events for one example of PIPCS. Request UIDs 205a provides example tracking data for newly generated unique identifiers UID1 to UID13. Production Run for Unit Products 205b provides example tracking data for unique identifiers UID1, UID2, UID4 through UID6 and UID8 through UID10, where these unique identifiers have been newly commissioned to represent an individually packaged product ABC01. It also illustrates the spoilage of unique identifiers as part of a manufacturing process, with UID3 and UID7, such as when products in a packaging assembly line are damaged or rejected due to quality concerns. Production Run for Cartonized Products 205c provides example tracking data for unique identifiers UID11 and UID12 where these unique identifiers have been newly commissioned to represent carton packaging. Unique Identifier UID11 represents a new carton product ABC01-3, which is composed of three individually packaged items designated by the unique identifiers UID1, UID2 and UID4. Similarly, unique identifier UID12 represents a new carton product which is composed of three individual packaged items designated by UID5, UID6 and UID8.

FIG. 25 continues with example tracking data, illustrating additional products tracking events. Shipping 205d provides example tracking data for unique identifier UID13, which represents a new shipment containing two items represented by the unique identifiers UID11 and UID12. Since both unique identifiers represent carton products comprising individual products, the example tracking data illustrates that, while the new shipment UID13 only directly contains the two products UID11 and UID12, the change in status of the carton product UID11 upon its child individually packaged products UID1, UID2 and UID4, are reflected in the data, and as is the change of status of the carton product UID12 upon its child products UID5, UID6 and UID8. Receiving 205e provides example tracking data from the products received event, for the shipment identified with UID13, containing two items, UID11 and UID12, representing carton products. Since both unique identifiers represent carton products comprising individual products, the example tracking data also includes records for the carton products UID11 and UID12, as well as their individually packaged child products UID1, UID2, UID4, UID5, UID6 and UID8. Sell Unit Product 205f provides example tracking data for the sale to end-consumer event of an individually packaged product UID1. As UID1 is a child product of the carton UID11, the sale of UID1 automatically triggers a second event of de-cartonization for UID11, making it unavailable for any further events.

Figure 26:
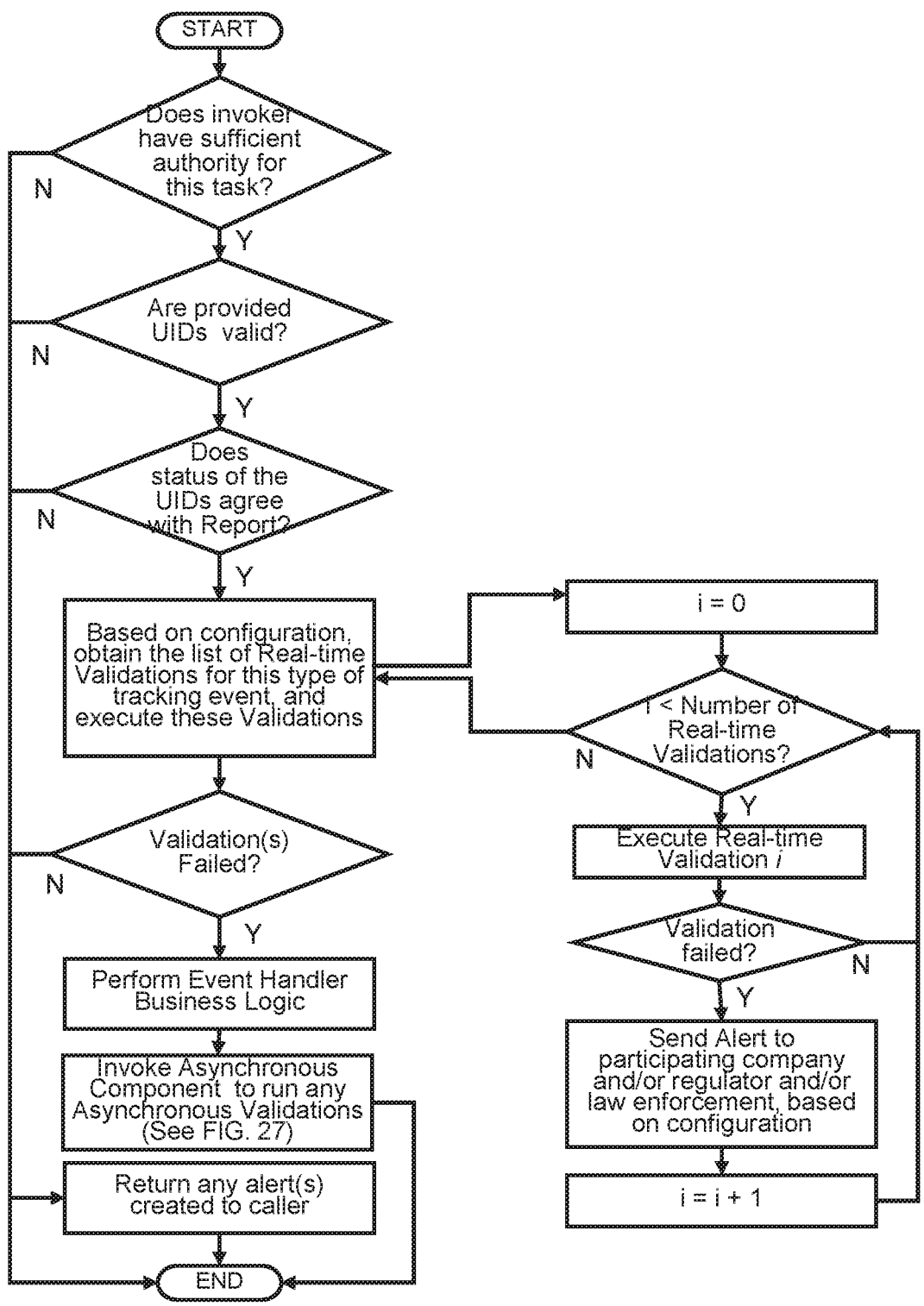
FIG. 26 is a flowchart of an example method to evaluate the logic of a validation processed in real-time.
Figure 27:
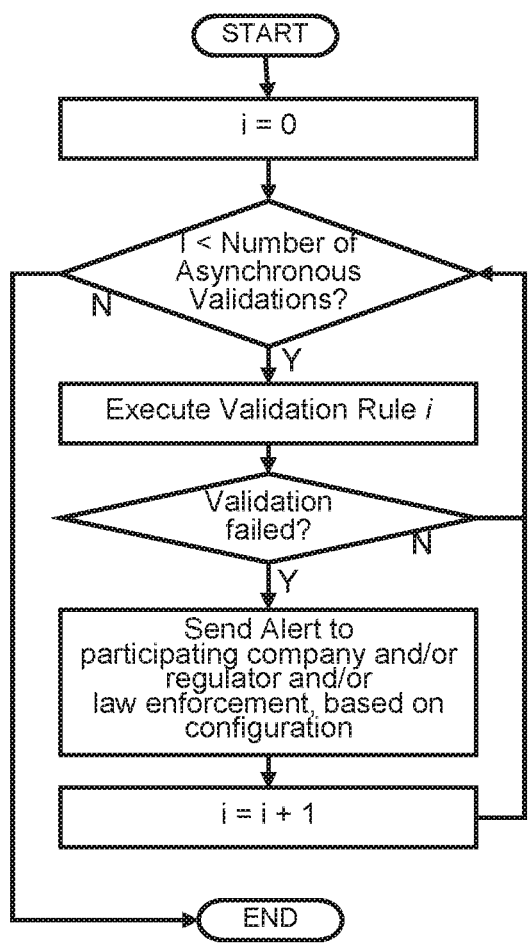
FIG. 27 is a flowchart of an example method to evaluate the logic of an asynchronous validation.

FIG. 26 provides further detail for the processing of a Transaction Event submitted from Tracking Web Services (REST) 225 to Event Handler Business Logic 256, in FIG. 9, Processing of User and System Requests. An Event Handler Business Logic 256 (FIG. 9) component is implemented for each tracking event, some examples of which are, New Product (elaborated in FIG. 12), Intake Product (elaborated in FIG. 13), Shipping (elaborated in FIG. 14), Receiving (elaborated in FIG. 15), Sale to Consumer (elaborated in FIG. 16), Sale Return from Consumer (elaborated in FIG. 17), Product Outflow (elaborated in FIG. 18), Spoiled, Damaged or Expired Products (elaborated in FIG. 19), and Planned Destruction (elaborated in FIG. 20). The general algorithm of an Event Handler Business Logic 256 (FIG. 9) component include the following steps: (a) confirm invoking user's authority to invoke this tracking event; (b) Confirm that the UID(s) provided in the request are already registered in PIPCS; (c) validate the status and location of the UID(s) for which the event took place; (d) iterate through the list of additional validation rules configured for the tracking event type, dispatch any alerts raised to the configured addressees, examples of which could be regulators, law enforcement or designated officials at involved participating companies; (e) if any alerts were raised, return to invoking component with a list of alert messages; (f) perform any business logic required for the tracking event; and, (g) if any asynchronous validation rules are configured for the tracking event, initiate an asynchronous component to, as described in FIG. 27 (see below), iterate through the list of validation rules configured, and dispatch any alert raised to the configured addressees, examples of which could be regulators, law enforcement or designated officials at involved participating companies.

Some examples of real-time validation rules are: (i) for sale of variable-measure products, validate that the quantity to be sold is less than or equal to the remaining quantity available for sale from the variable-measure product indicated by the supplied unique identifier; and (ii) determine the gap in serial numbers, if any, between the first serial number indicated in the unique identifiers of child products in the current shipment, and the last serial number indicated in the unique identifiers of child products in the previous Shipping event.

Some examples of asynchronous validation rules are: (i) compare accumulated production over last 60 days against expected production capacity; (ii) compare quantity of ingredients/components with quantity of final product produced; and (iii) compare participating company's accumulated quantity of production inputs against accumulated quantity of production output.

Figure 28:
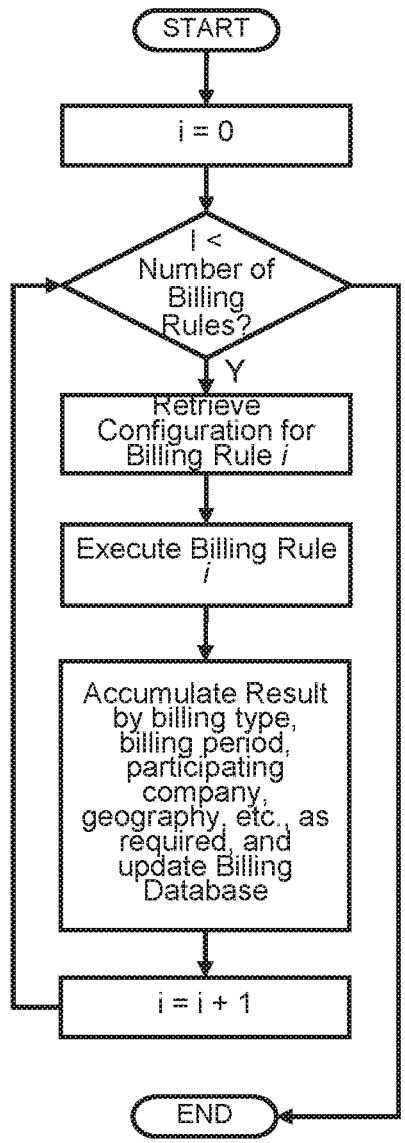
FIG. 28 is a flowchart of an example method to calculate the billing or charge-back amounts of participating companies.

FIG. 28 describes the general algorithm for the billing and charge-back component, which calculates fees charged to participating companies, is independent of the tracking system, and executed on a periodic basis. The billing and charge-back component is comprised of billing rules which are executed for each tracking event captured for a time period. The billing rules are configured in the billing and charge-back component to indicate their rates and calculation formulas. The billing and charge-back component retrieves the list of configured billing rules, and iterates over this list, executing each billing rule for each tracking event in the time period for which billing is being calculated. After the billing rules have executed, the resulting billing transactions are summarized based on configuration, and reported. Some examples of billing rules are: (a) fixed fee at point of sale; (b) fee as a percentage of transaction monetary value at point of sale; (c) fixed fee at each successful transaction completion; and (d) fee as a percentage of transaction monetary value at each successful transaction completion.

Figure 29:
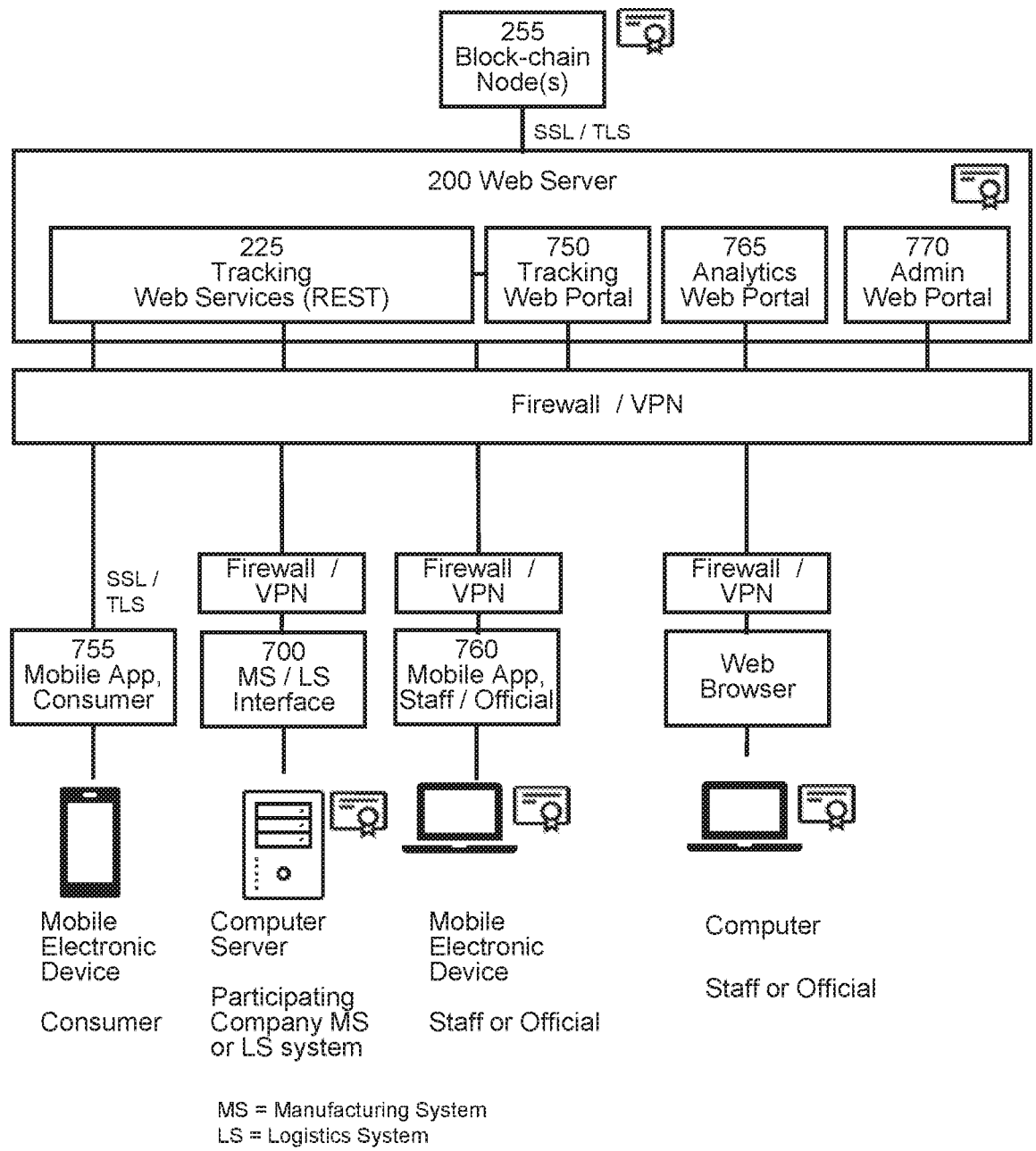
FIG. 29 is a schematic diagram of a system for provenance and illicit product control indicating security mechanisms.

FIG. 29 describes some of the examples of high-level network and system security precautions taken by PIPCS. Mobile electronic devices executing the Mobile Application for Consumer 755 component will use Secure Sockets Layer ("SSL")/Transport Layer Security ("TLS") network protocols to secure communications with the Tracking Web Services 225 component in Web Server 200. Mobile Electronic devices executing the Mobile Application for Staff or Official 760 component, and provided with digital certificates, will establish a virtual private network ("VPN") to secure communications with the Tracking Web Services 225 component in Web Server 200. Computer servers at participating companies executing MS, LS or RS, provided with digital certificates, will establish a VPN, which they will use for communication with the Tracking Web Services 225 component in Web Server 200. Personal computers, provided with digital certificates and utilizing Hypertext Transfer Protocol ("HTTP") web browsers, will establish a VPN to secure communications with the Analytics Web Portal 765 component in Web Server 200. The computer server Web Server 200 will use the SSL/TLS network protocol to establish communication with one or more computer servers, the Blockchain Nodes 255. Each Blockchain Node 255 will be provided with a digital certificate so that it may digitally sign messages that flow between nodes.

Figure 30:
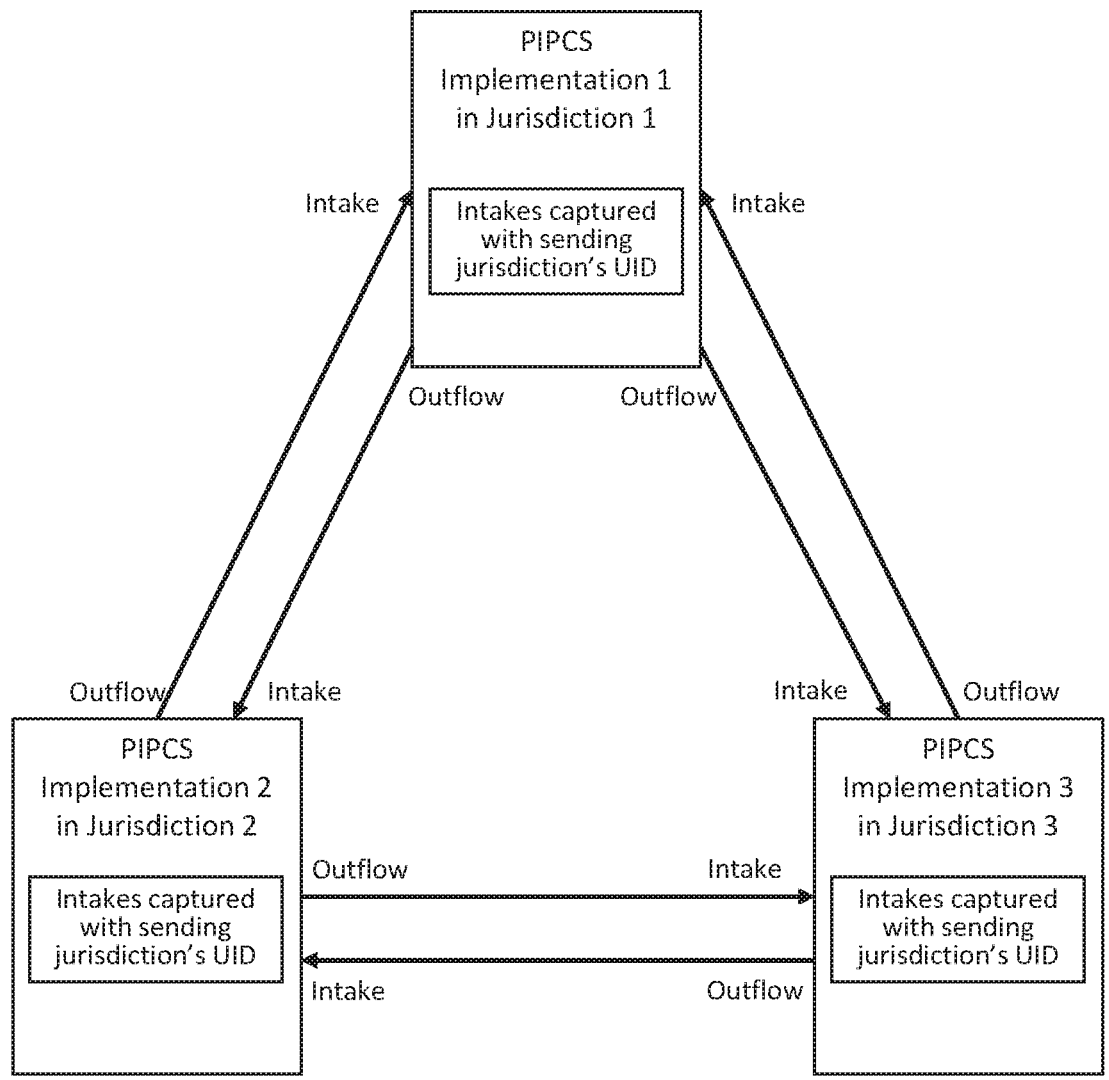
FIG. 30 is a schematic diagram indicating multiple systems for provenance and illicit product control interacting with one another, as product outflow from one system of such systems becomes intake for another.

FIG. 30 illustrates how multiple instances of PIPCS interact with each other to provide a seamless solution. Some examples of multiple, interacting PIPCS examples may include examples at national level, for countries that are trading partners, while other examples may include examples by large, multinational manufacturers, distributors and retail chains who are a part of the same supply chain. Products leaving one example of PIPCS, as described by Outflow 830 in FIG. 18, enter another PIPCS example, as described in Intake 810 in FIG. 13. The Intake 810 workflow captures any unique identifiers assigned by another example of PIPCS so that the PIPCS system can directly contact the other PIPCS example to request status and chain of custody reports.

Variations to the system 001 are contemplated. For example, although in the present example, the data store 215 (FIG. 5) is a blockchain, it is contemplated that the data store could be manifested with other solutions, such as No SQL databases or Relational databases.

As a further example, although in the present example the tagging of products with unique identifiers is viewed as labels, affixed to the products, imprinted with codes that a scanning device, using a light source and a light sensor, acquires the unique identifier value 805d/815c (FIG. 6), it is contemplated that the tagging of products could alternately be achieved with passive (radio frequency identification) RFID, active RFID, active RFID with global positioning system (GPS), ultra-wide band ("UWB") real-time location system ("RTLS"), W-Fi RTLS or infrared RTLS.

Additionally, although in the present example the random string 295c, 295f (FIG. 23) is viewed as being generated using computational methods, such as Yarrow or Fortuna, it is contemplated that random strings would also be generated using physical methods based on the laws of quantum mechanics.

Figure 31:
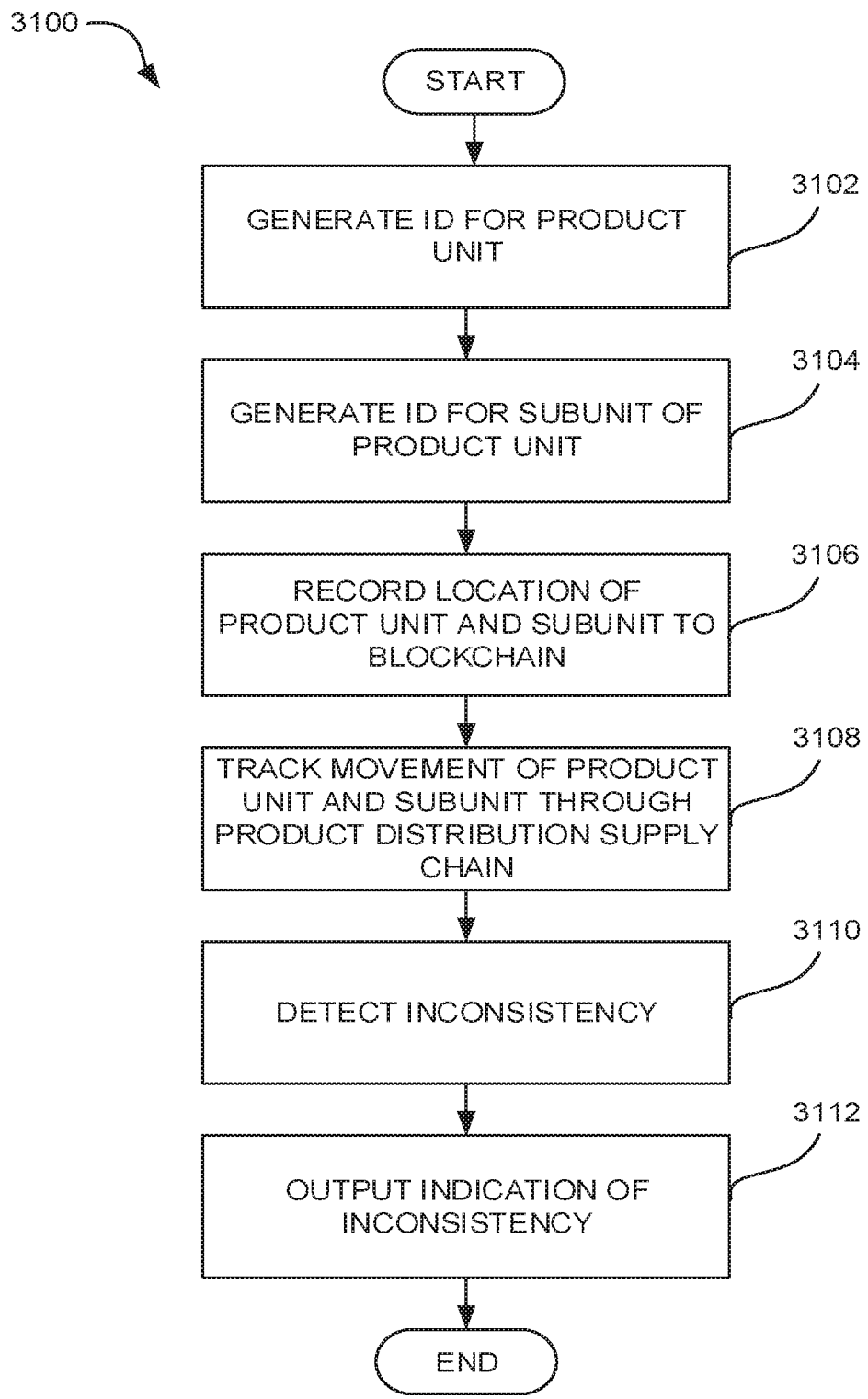
FIG. 31 is a flowchart of an example method to detect an inconsistency in movement of a product unit or subunit of the product unit through a product distribution supply chain.

FIG. 31 is a flowchart of an example method 3100 for provenance and illicit product control. In particular, the method 3100 is to detect an inconsistency in movement of a product unit or subunit of a product unit through a product distribution supply chain. The method 3100 may be applied to verify the authenticity, or in other words, provide provenance of, genuine products. Further, the method 3100 may be applied to monitor and control the distribution of illicit products, or products containing illicit ingredients, including drugs, alcohol, pharmaceutical products, other controlled substances, and the like. Thus, the method 3100 may be termed a method for provenance and illicit product control and may be combined with other methods and techniques for provenance and illicit product control as discussed herein.

Figure 32:
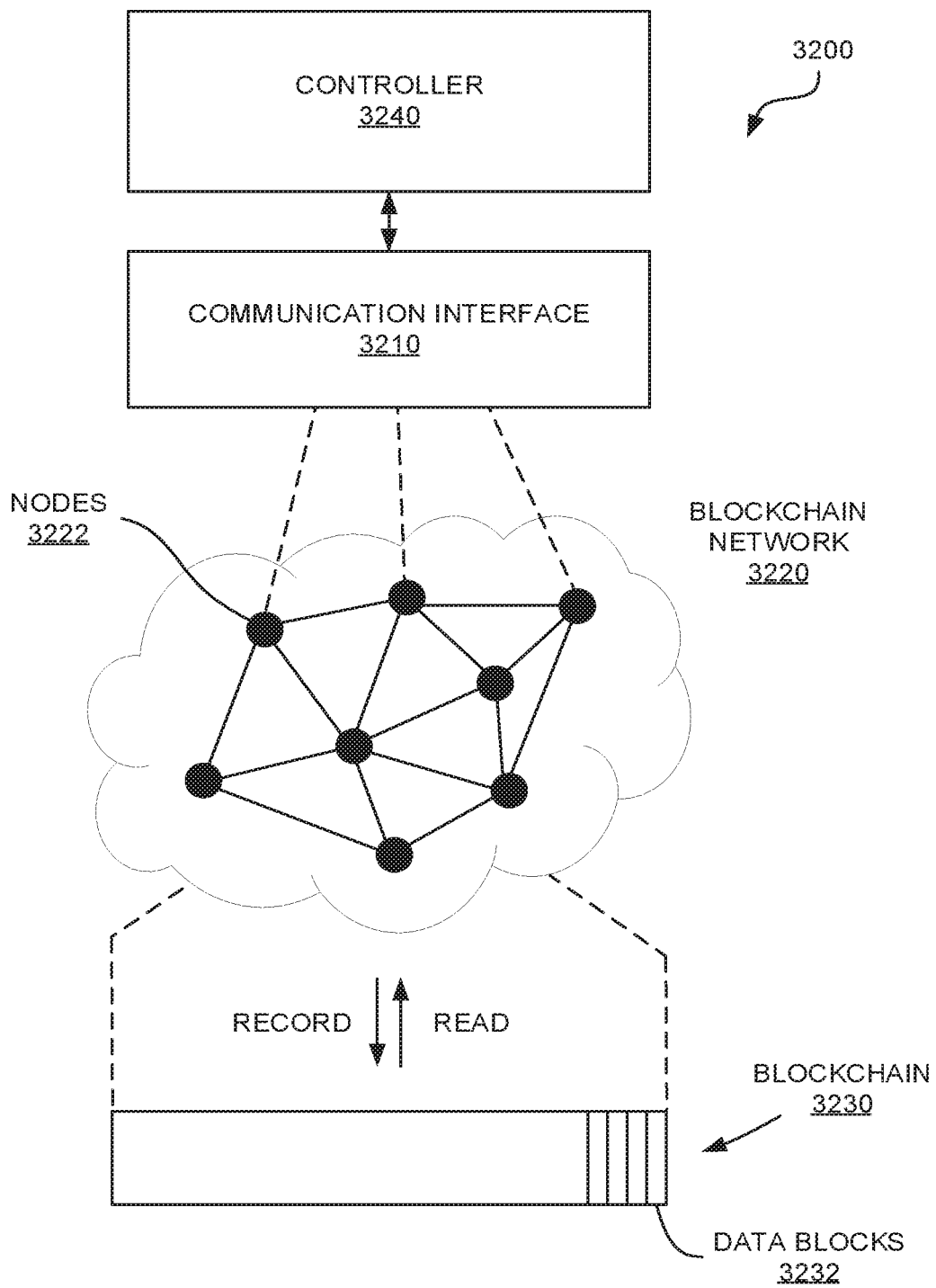
FIG. 32 is a schematic diagram of an example system to detect an inconsistency in movement of a product unit or subunit of the product unit through a product distribution supply chain.
Figure 33:
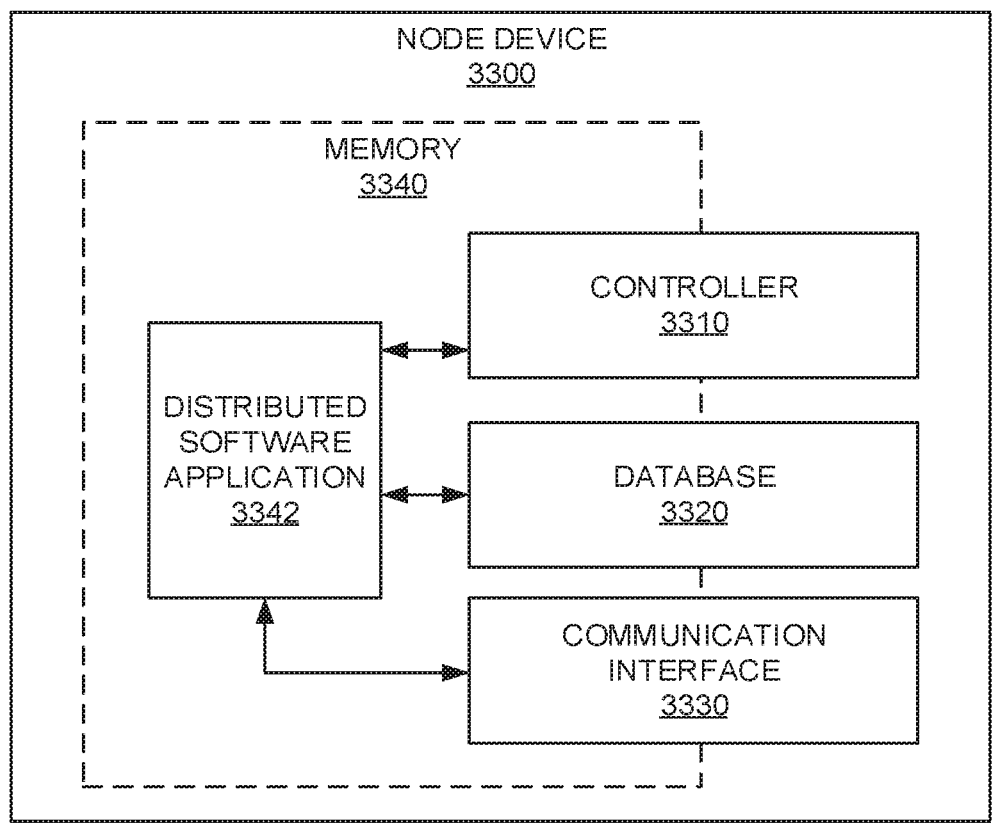
FIG. 33 is a schematic diagram of an example node of a blockchain network.
Figure 34:
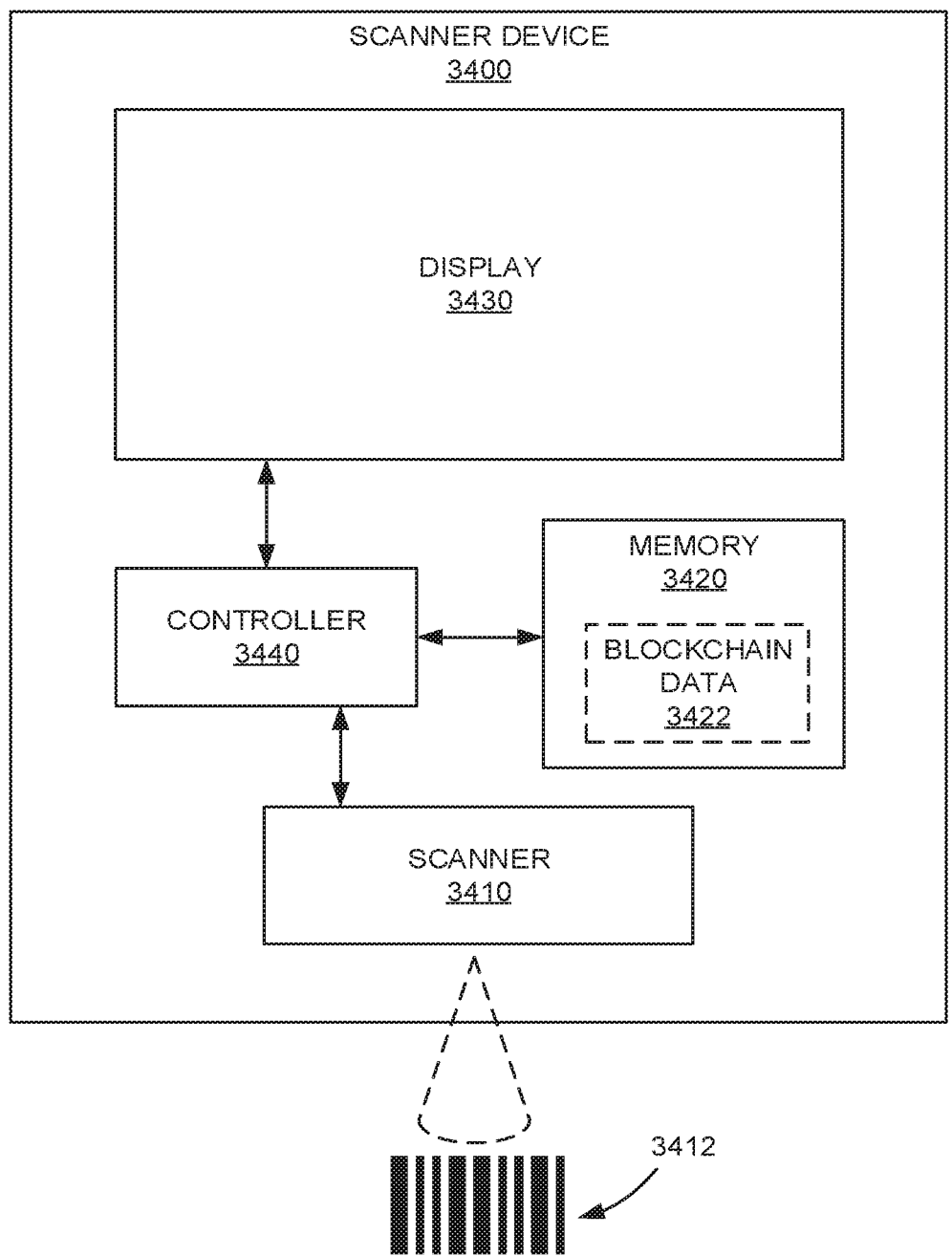
FIG. 34 is a schematic diagram of an example device to scan a mark encoded with a unique identifier to detect an inconsistency in movement of a product unit or subunit of the product unit through a product distribution supply chain.

Further, steps of the method 3100 may be executed by a system or device as described herein, including the system 3200 of FIG. 32, the node device 3300 of FIG. 33, the scanner device 3400 of FIG. 34, or another system or device described herein, and other systems or devices. Further, the method 3100 may be embodied in instructions stored on a non-transitory machine-readable storage medium executable by a processor of a computing device to execute the method 3100.

At block 3102, a unique identifier for a product unit is generated, and at block 3104, a unique identifier for a subunit of the product unit is generated. Such unique identifiers may be generated according to any means discussed herein.

In some cases, the product unit may include a group of single units of an end-user consumable product, and the subunit of the product unit may include a single unit of the end-user consumable product. For example, where the end-user consumable product is a package of a consumable product, the product unit may include a carton, pallet, or larger package of the packages of consumable product. As a further example, the group of single units of the end-user consumable product may include a shipping pallet of single units of the end-user consumable product.

In other cases, the product unit may include a single unit of an end-user consumable product, and the subunit of the product unit may include an ingredient of the end-user consumable product. For example, the product unit may include a beverage, food product, smokable product, or other consumable product, and the ingredient may include a particular ingredient that provides flavour or another affect to the consumable product. The ingredient may include a controlled substance such as an alcohol, recreational drug, pharmaceutical products, or other controlled substance, and the like.

At block 3106, a location of the product unit is recorded to a blockchain in association with the unique identifier for the product unit. The blockchain includes linked data blocks containing sequential records of locations and quantities of product units and subunits of the product units moved through a product distribution supply chain. Further, a location of the subunit of the product unit is recorded to the blockchain in association with the unique identifier for the subunit of the product unit.

At block 3108, movement of the product unit and the subunit of the product unit are tracked through the product distribution supply chain. Tracking movement of the product unit or subunit of the product unit may involve a technique as described with respect to a system, method, or device described herein.

At block 3110, an inconsistency between a record on the blockchain and movement of the product unit or the subunit of the product unit through the product distribution supply chain is detected. Detecting such an inconsistency may involve a technique as described with respect to a system, method, or device described herein.

In some cases, an inconsistency may be detected based on failure to authenticate a unique identifier. For example, detecting the inconsistency may involve tracking the product unit or the subunit of the product unit to an expected location in the product distribution supply chain, receiving a result of scanning a mark encoded with the unique identifier for the product unit or the subunit of the product unit at the expected location, and failing to verify the unique identifier for the product unit or the subunit of the product unit in the result.

In some cases, an inconsistency may be detected based on identification of a missing unique identifier from a range of expected unique identifiers. For example, detecting the inconsistency may involve tracking the product unit or the subunit of the product unit to an expected location in the product distribution supply chain, receiving a result of scanning a mark encoded with the unique identifier for the product unit or the subunit of the product unit at the expected location, and identifying an absence of the unique identifier for the subunit of the product unit in the result from a range of expected unique identifiers.

In some cases, an inconsistency may be detected based on a discrepancy in a quantity of product moving through the supply chain. For example, detecting the inconsistency may involve tracking the product unit or the subunit of the product unit to an expected location in the product distribution supply chain, receiving a result of scanning a mark encoded with the unique identifier for the product unit or the subunit of the product unit, and identifying an absence or excess of a quantity of subunits of the product unit in the result.

In some cases, an inconsistency may be detected based on movement of a particular product to an unexpected or unauthorized location. For example, detecting the inconsistency may involve receiving a result of scanning a mark encoded with the unique identifier for the product unit or the subunit of the product unit, and identifying a location of the product unit or the subunit of the product unit as corresponding to an unexpected or unauthorized location. The location of the particular product may be determined by a location-detecting device associated with the device used to scan the mark. For example, where the device used to scan the mark includes or is coupled to a mobile device such as a smart phone, the location of the particular product may be inferred from the location of the mobile device, such as through reading the GPS data associated with the mobile device.

An inconsistency may be detected in real-time using a scanner device such as the scanner device 3400 of FIG. 34 or may be detected historically based on analysis of historical blockchain data. When using a scanner device, the method 3100 may further involve scanning a mark encoded with the unique identifier for the product unit or the subunit of the product unit, and displaying a record of previously recorded locations of the product unit or the subunit of the product unit on the blockchain.

Further, an inconsistency can be detected based on a discrepancy between the movement of product into, out from, and stored at a particular facility. For example, detecting the inconsistency may involve detecting a discrepancy between a stated manufacturing capacity of a production facility to produce the product unit or the product subunit, and a reported quantity of the product unit or the product subunit shipped from the production facility. Such a discrepancy may indicate that a quantity of product unit or product subunit was moved to the black market. Such reported quantities may be stored on a blockchain or other systems as discussed herein.

As another example, detecting an inconsistency may involve detecting a discrepancy between a reported quantity of the product unit or the product subunit received at a warehouse facility, and a reported quantity of the product unit or the product subunit shipped to the warehouse facility and a reported quantity of the product unit or the product subunit in inventory at the warehouse facility. Such a discrepancy may indicate that a quantity of product unit or product subunit was moved to the black market. Such reported quantities may be stored on a blockchain or other systems as discussed herein.

As another example, detecting an inconsistency may involve detecting a discrepancy between a reported quantity of the product unit or the product subunit received at a retail facility, and a reported quantity of the product unit or the product subunit sold from the retail facility and a reported quantity of the product unit or the product subunit in inventory at the retail facility. Such a discrepancy may indicate that a quantity of product unit or product subunit was moved to the black market. Such reported quantities may be stored on a blockchain or other systems as discussed herein.

As another example, detecting an inconsistency may involve detecting a discrepancy between a reported quantity of the product unit or the product subunit received at a manufacturing facility, and a reported quantity of the product unit or the product subunit consumed as an ingredient in manufacturing of product units or product subunits and a reported quantity of the product unit or the product subunit in inventory at the manufacturing facility. Such a discrepancy may indicate that a quantity of product unit or product subunit was moved to the black market. Such reported quantities may be stored on a blockchain or other systems as discussed herein.

At block 3112, an indication of the inconsistency is outputted. The inconsistency may be outputted as an alert or alarm. Further, the product unit or subunit of the product unit may be flagged as relating to the inconsistency. Flagged products may be halted from moving further through the product distribution supply chain.

FIG. 32 is a schematic diagram of an example system 3200 for provenance and illicit product control. In particular, the system 3200 is to detect an inconsistency in movement of a product unit or subunit of the product unit through a product distribution supply chain. Further, the system 3200 may be applied to monitor and control the distribution of illicit products, or products containing illicit ingredients, including drugs, alcohol, pharmaceutical products, other controlled substances, and the like, and thus may be termed a system for provenance and illicit product control, and may be combined with other systems and techniques for provenance and illicit product control as discussed herein.

Further, the system 3200 may execute any steps of any method as described herein, including the method 3100 of FIG. 31 or any other method described herein to verify the authenticity, or in other words, provide provenance of, genuine products.

The system 3200 includes a communication interface 3210 to communicate with nodes of a blockchain network 3220. The blockchain network 3220 includes nodes 3222 to verify linked data blocks 3232 of a blockchain 3230 containing sequential records of locations and quantities of product units and subunits of the product units moved through a product distribution supply chain. The communication interface 3210 may include any quantity and combination of a processor, a central processing unit (CPU), a microprocessor, a microcontroller, a field-programmable gate array (FPGA), and similar to execute instructions stored on a non-transitory machine-readable storage medium. The communication interface 3210 includes programming logic enabling the controller 3240 to communicate over the blockchain network 3220, is configured for bidirectional data communications through the network, and accordingly can include a network adaptor and driver suitable for the type of network.

The system 3200 further includes a controller 3240 to execute instructions to track movement of the product unit and the subunit of the product unit through the product distribution supply chain, detect an inconsistency between a record on the blockchain 3230 and movement of the product unit or the subunit of the product unit through the product distribution supply chain, and output an indication of the inconsistency. Such inconsistencies may be detected based on any of the techniques discussed with respect to the method 3100 of FIG. 31. The controller 3240 may include any quantity and combination of a processor, a central processing unit (CPU), a microprocessor, a microcontroller, a field-programmable gate array (FPGA), and similar to execute instructions stored on a non-transitory machine-readable storage medium.

FIG. 33 is a schematic diagram of an example node device 3300 of a blockchain network. The node device 3300 hosts a blockchain node of a blockchain network that stores a blockchain that includes data blocks containing sequential records of locations and quantities of product units and subunits of the product units moved through a product distribution supply chain. Thus, the node device 3300 may be similar to the nodes 3222 of FIG. 32, and for further description thereof, reference may be had to the description of FIG. 32.

The node device 3300 includes a controller 3310, database 3320, communication interface 3330, and memory 3340. The controller 3310 may include any quantity and combination of a processor, a central processing unit (CPU), a microprocessor, a microcontroller, a field-programmable gate array (FPGA), and similar. The database 3320 may include non-volatile storage on which any kind of database, such as one or more SQL databases, for storing portions of a blockchain, may be maintained. The communication interface 3330 includes programming logic enabling the node device 3300 to communicate over a peer-to-peer blockchain network, is configured for bidirectional data communications through the network, and accordingly can include a network adaptor and driver suitable for the type of network. The controller 3310, database 3320, communication interface 3330, and memory 3340, cooperate to implement services such as identity services, key management, scheduling, messaging, a network map cache, state manager, other custom services and the like.

The memory 3340 may include non-transitory machine-readable instructions, such as a software application, to enable the node device 3300 to communicate with other nodes over a peer-to-peer network and to interface with a blockchain. Such instructions may be installed at the node level across the node device 3300 and other nodes. In other words, the node device 3300 may execute a distributed software application 3342. Such a distributed software application 3342 may include components to implement any of the methods described herein, or any portions thereof, including recording a location or movement of a product unit or a subunit of the product unit through a product distribution supply chain, reading a record of locations or movements of product units or subunits of product units. The distributed software application 3342 may further include components to generate a smart contract for to fulfill any of the methods described herein. Since entries on the blockchain are verified by the nodes of the blockchain as the information is propagated throughout the network, such smart contracts are secured, and made verifiable, by being recorded on the blockchain.

FIG. 34 is a schematic diagram of an example scanner device 3400 to scan a mark 3412 encoded with a unique identifier to detect an inconsistency in movement of a product unit or subunit of the product unit through a product distribution supply chain. The scanner device 3400 may be used in conjunction with the system 3200 of FIG. 32, and may be used to perform steps of the method 3100 of FIG. 31.

The scanner device 3400 includes a scanner 3410 to scan a mark 3412 encoded with a unique identifier for a product unit or a subunit of the product unit. The scanner 3410 may include a camera, barcode scanner, QR code scanner, or any other scanner suitable to read the mark 3412. The mark 3412 may be marked on a product unit, a subunit of a product unit, or any other combined quantity of product, such as a carton or pallet of a product.

The scanner device 3400 further includes memory 3420 to store blockchain data 3422. Similar to as described with respect to the blockchain 3230 of FIG. 32, the blockchain data 3422 includes sequential records of locations and quantities of product units and subunits of the product units moved through the product distribution supply chain. The blockchain data 3422 is also stored on a blockchain hosted by nodes of a blockchain network. The memory 3420 may include voltage or non-volatile storage on which instructions may be stored, and on which any kind of database, such as one or more SQL databases, for storing portions of a blockchain and other data, may be maintained.

The scanner device 3400 further includes a display 3430 to visually display information to a user, including user interface elements to control the scanner device 3400, and representations of blockchain data 3422.

The scanner device 3400 further includes a controller 3440 to execute instructions to access a blockchain network hosting the blockchain, detect an inconsistency between a first record on the blockchain and a second record on the blockchain, display a list of previously recorded locations of the product unit or the subunit of the product unit on the blockchain through the display, and display an indication of the inconsistency through the display 3430. Such inconsistencies may be detected based on any of the techniques discussed with respect to the method 3100 of FIG. 31. The controller 3440 may include any quantity and combination of a processor, a central processing unit (CPU), a microprocessor, a microcontroller, a field-programmable gate array (FPGA), and similar to execute instructions stored on a non-transitory machine-readable storage medium.

In some examples, when an inconsistency is detected, the scanner device 3400 may provide the user with an option through the display 3430 to submit information to a law enforcement or regulatory agency. In such examples, the scanner device 3400 includes an input device such as a keyboard or touch screen for the user to input information and a communication interface to communicate with one or more computing or telecommunications networks to relay such information to the appropriate agencies. Thus, the information stored on the provenance and illicit product control system may be further secured by the monitoring and verification of the movement of product by a plurality of users throughout the supply chain.

In some examples, the scanner device 3400 may include a smart phone, tablet, or other mobile computing device having a display to display visual information and a scanner, such as a camera, to scan a mark 3412. In other examples, the scanner device 3400 may include a smart phone, tablet, or other mobile computing device having a display to display visual information, and an attachable scanner device to scan the mark 3412, such as a camera, barcode scanner, QR code scanner, and the like.

Thus it can be seen that the system can observe legitimate entry of products into an industry, or a subset of an industry, capture tracking information of legitimate movement of products within the industry, and the legitimate exit of products from an industry, or a subset of an industry, while creating obstacles to attempts at adding counterfeit products to the legitimate supply chains of an industry, or a subset of an industry, and having means to detect theft or diversion of products. Further, multiple implementations of such provenance and illicit product control systems may be implemented across different industries or even across different jurisdictions (e.g. different pharmaceutical industries in different jurisdictions), and such systems may be seamlessly integrated with one another so that inconsistencies can be identified across the different systems. Thus, provenance and illicit product control may be provided across industrial and jurisdictional boundaries.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
generating, by a control system, a first unique identifier for a product unit, the first unique identifier including a first company identifier of a first company associated with the product unit, a first serial number of the product unit, and a first random string;
generating, by a control system, a second unique identifier for a subunit of the product unit, the second unique identifier including a second company identifier of a second company associated with the subunit, a second serial number of the subunit, and a second random string;
recording a location of the product unit to a blockchain in association with the first unique identifier for the product unit, the blockchain comprising linked data blocks containing sequential records of locations and quantities of product units and subunits of the product units moved through a product distribution supply chain;
recording a location of the subunit of the product unit to the blockchain in association with the second unique identifier for the subunit of the product unit;
tracking movement of the product unit and the subunit of the product unit through the product distribution supply chain using the first and second unique identifiers;
detecting an inconsistency between a record on the blockchain and movement of the product unit or the subunit of the product unit through the product distribution supply chain using the first and second unique identifiers;
outputting an indication of the inconsistency; and
in response to detection of the inconsistency, halting movement of the product unit or the subunit of the product unit through the product distribution supply chain.

2. The method of claim 1, wherein the product unit comprises a group of single units of an end-user consumable product, and the subunit of the product unit comprises a single unit of the end-user consumable product.

3. The method of claim 2, wherein the group of single units of the end-user consumable product comprises a shipping pallet of single units of the end-user consumable product.

4. The method of claim 1, wherein the product unit comprises a single unit of an end-user consumable product, and the subunit of the product unit comprises an ingredient of the end-user consumable product.

5. The method of claim 4, wherein the ingredient comprises a controlled substance.

6. The method of claim 1, wherein detecting the inconsistency comprises:
tracking the product unit or the subunit of the product unit to an expected location in the product distribution supply chain;
receiving a result of scanning a mark encoded with the first unique identifier for the product unit or the second unique identifier for the subunit of the product unit at the expected location; and
failing to verify the first unique identifier for the product unit or the second unique identifier for the subunit of the product unit in the result.

7. The method of claim 1, wherein detecting the inconsistency comprises:
tracking the product unit or the subunit of the product unit to an expected location in the product distribution supply chain;
receiving a result of scanning a mark encoded with the first unique identifier for the product unit or the second unique identifier for the subunit of the product unit at the expected location; and
identifying an absence of the second unique identifier for the subunit of the product unit in the result from a range of expected unique identifiers.

8. The method of claim 1, wherein detecting the inconsistency comprises:
tracking the product unit or the subunit of the product unit to an expected location in the product distribution supply chain;
receiving a result of scanning a mark encoded with the first unique identifier for the product unit or the second unique identifier for the subunit of the product unit; and
identifying a deficit or excess of a quantity of subunits of the product unit in the result.

9. The method of claim 1, wherein detecting the inconsistency comprises:
receiving a result of scanning a mark encoded with the first unique identifier for the product unit or the second unique identifier for the subunit of the product unit; and
identifying a location of the product unit or the subunit of the product unit as corresponding to an unexpected or unauthorized location.

10. The method of claim 1, wherein detecting the inconsistency comprises detecting a discrepancy between:

a stated manufacturing capacity of a production facility to produce the product unit or the product subunit, and a reported quantity of the product unit or the product subunit shipped from the production facility.

11. The method of claim 1, wherein detecting the inconsistency comprises detecting a discrepancy between:

a reported quantity of the product unit or the product subunit received at a warehouse facility, and a reported quantity of the product unit or the product subunit shipped to the warehouse facility and a reported quantity of the product unit or the product subunit in inventory at the warehouse facility.

12. The method of claim 1, wherein detecting the inconsistency comprises detecting a discrepancy between:

a reported quantity of the product unit or the product subunit received at a retail facility, and a reported quantity of the product unit or the product subunit sold from the retail facility and a reported quantity of the product unit or the product subunit in inventory at the retail facility.

13. The method of claim 1, wherein detecting the inconsistency comprises detecting a discrepancy between:

a reported quantity of the product unit or the product subunit received at a manufacturing facility, and a reported quantity of the product unit or the product subunit consumed as an ingredient in manufacturing of product units or product subunits and a reported quantity of the product unit or the product subunit in inventory at the manufacturing facility.

14. The method of claim 1, wherein outputting the indication of the inconsistency comprises displaying an alert indicating the inconsistency.

15. The method of claim 1, further comprising flagging the product unit or the subunit of the product unit as relating to the inconsistency.

16. The method of claim 1, further comprising:

scanning a mark encoded with the first unique identifier for the product unit or the second unique identifier for the subunit of the product unit; and displaying a record of previously recorded locations of the product unit or the subunit of the product unit on the blockchain.

17. A system comprising:

a communication interface to communicate with nodes of a blockchain network, the blockchain network comprising nodes to verify linked data blocks containing sequential records of locations and quantities of product units and subunits of the product units moved through a product distribution supply chain;

a controller to execute instructions to:

generate a first unique identifier for a product unit, the first unique identifier including a first company identifier of a first company associated with the product unit, a first serial number of the product unit, and a first random string;

generate a second unique identifier for a subunit of the product unit, the second unique identifier including a second company identifier of a second company associated with the subunit, a second serial number of the subunit, and a second random string;

track movement of the product unit and the subunit of the product unit through the product distribution supply chain using the first and second unique identifiers;

detect an inconsistency between a record on the blockchain and movement of the product unit or the subunit of the product unit through the product distribution supply chain using the first and second unique identifiers;

output an indication of the inconsistency; and in response to detection of the inconsistency, halting movement of the product unit or the subunit of the product unit through the product distribution supply chain.

18. A device comprising:

a scanner to scan a mark encoded with a first unique identifier for a product unit or a second unique identifier for a subunit of the product unit, the first unique identifier including a first company identifier of a first company associated with the product unit, a first serial number of the product unit, and a first random string, the second unique identifier including a second company identifier of a second company associated with the subunit, a second serial number of the subunit, and a second random string;

memory to store blockchain data, the blockchain data comprising sequential records of locations and quantities of product units and subunits of the product units moved through a product distribution supply chain in association with respective first and second unique identifiers, the blockchain data recorded to a blockchain;

a display; and a controller to execute instructions to:

access a blockchain network hosting the blockchain;

detect an inconsistency between a first record on the blockchain and a second record on the blockchain using the first and second unique identifiers;

display a list of previously recorded locations of the product unit or the subunit of the product unit on the blockchain through the display;

display an indication of the inconsistency through the display; and in response to detection of the inconsistency, halting movement of the product unit or the subunit of the product unit through the product distribution supply chain.

19. The method of claim 1, wherein halting movement of the product unit or the subunit of the product unit through the product distribution supply chain comprises denying authorization to move a shipment containing the product unit or the subunit of the product unit.

20. The method of claim 1, further comprising using a cryptographically secure pseudo-random number generator to generate the first and second random strings of the first and second unique identifiers.

* * * * *